United States Patent
Akatsuka

(10) Patent No.: US 11,180,147 B2
(45) Date of Patent: *Nov. 23, 2021

(54) VEHICLE CONTROL APPARATUS

(71) Applicant: TOYOTA JIDOSHA KABUSHIKI KAISHA, Toyota (JP)

(72) Inventor: Kosuke Akatsuka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

This patent is subject to a terminal disclaimer.

(21) Appl. No.: 16/451,076

(22) Filed: Jun. 25, 2019

(65) Prior Publication Data

US 2020/0001873 A1    Jan. 2, 2020

(30) Foreign Application Priority Data

Jun. 27, 2018  (JP) .............................. JP2018-121889

(51) Int. Cl.
  *B60W 30/18*   (2012.01)
  *B60W 10/04*   (2006.01)
  *B60W 10/18*   (2012.01)

(52) U.S. Cl.
  CPC ...... *B60W 30/18009* (2013.01); *B60W 10/04* (2013.01); *B60W 10/18* (2013.01); *B60W 2510/182* (2013.01); *B60W 2540/10* (2013.01)

(58) Field of Classification Search
  CPC ................. B60W 30/16; B60W 10/04; B60W 2720/106; B60W 10/18; B60W 2540/12; B60W 2520/105
  See application file for complete search history.

(56) References Cited

U.S. PATENT DOCUMENTS 9,643,607 B2 *   5/2017   Nagatsuka ............ B60T 8/1766
2001/0016538 A1   8/2001   Saito et al.
(Continued)

FOREIGN PATENT DOCUMENTS

JP   2001-233082 A    8/2001
JP   2011183983 A *   9/2011
(Continued)

OTHER PUBLICATIONS

Office Action dated Apr. 6, 2021 in U.S. Appl. No. 16/450,285.
Notice of Allowance dated Jul. 27, 2021 in U.S. Appl. No. 16/450,285.

*Primary Examiner* — Aniss Chad
*Assistant Examiner* — Elijah W. Vaughan
(74) *Attorney, Agent, or Firm* — Sughrue Mion, PLLC

(57) ABSTRACT

When having determined that an operation of an accelerator operator is initiated at a first timing and the operation amount continues to increase until a second specific timing arrives to become constant at a second timing, vehicle control means which a vehicle control apparatus comprises executes driving force control in such a manner that a time-differential value of controlled driving force during a first period from the second timing to a first terminal timing matches with a time-differential value of controlled driving force at the second specific timing as well as executes braking force control in such a manner that a time-differential value of the controlled braking force during the first period becomes a value more than or equal to a sum of a time-differential value of the controlled braking force at the second specific timing and a time-differential value of operation driving force at the second specific timing.

4 Claims, 16 Drawing Sheets

(56) References Cited

U.S. PATENT DOCUMENTS

2018/0009440 A1    1/2018  Kozuka
2020/0010087 A1*   1/2020  Akatsuka .............. B60W 20/15

FOREIGN PATENT DOCUMENTS

JP    2017-065451 A    4/2017
JP    2018-002116 A    1/2018

* cited by examiner

VEHICLE CONTROL APPARATUS

TECHNICAL FIELD

The present invention relates to a driving force control to automatically apply (add) driving force (controlled driving force) on a vehicle and to a braking force control to automatically apply (add) braking force (controlled braking force) on a vehicle.

BACKGROUND ART

A vehicle control apparatus has been conventionally known, the vehicle control apparatus performing, based on a surrounding situation of a vehicle, a driving operation state of the vehicle, a traveling state of the vehicle, and so on, a driving force control to automatically apply driving force on the vehicle and a braking force control to automatically apply braking force on the vehicle. Controls as mentioned above are performed as a driving support control and an automatic driving control. Here, the "surrounding situation of a vehicle" includes information on a distance, a direction (orientation), a relative speed, and the like for an obstacle (an other vehicle, a pedestrian, a building, and so on) existing around the vehicle. The "driving operation state of the vehicle" includes a steering angle of a steering wheel and the like. The "traveling state of the vehicle" includes a vehicle speed, acceleration, jerk, and the like. Jerk is a time rate of change of acceleration. The "driving support control" includes an adaptive cruise control, an intelligent parking assist control, and so on. The "automatic driving control" includes in principal an automatic traveling control, an automatic parking control, and so on which do not require any accelerating operation or braking operation by a driver. Hereinafter, the driving force applied by the driving force control will be referred to as a "controlled driving force" and the braking force applied by the braking force control will be referred to as a "controlled braking force". In addition, the driving support control and the automatic driving control will be collectively referred to as a "vehicle control".

The vehicle control reduces or removes a burden in a driving operation by the driver. However, there may be a case where the driver desires to change a behavior of the vehicle during the vehicle control being executed. In such a case, the driver operates an accelerator pedal or a brake pedal on his/her own to increase or moderate an acceleration feeling of the vehicle or to increase or moderate a deceleration feeling of the vehicle.

In the present specification, "the acceleration feeling increases" means that jerk of the accelerating vehicle increases, "the acceleration feeling is moderated" means that jerk of the accelerating vehicle decreases, "the deceleration feeling increases" means that jerk of the decelerating vehicle decreases, and "the deceleration feeling is moderated" means that jerk of the decelerating vehicle increases. Now, a term "accelerating" includes not only an acceleration during traveling, but also an acceleration of when progressing from a stopping state.

Japanese Patent Application Laid-Open (kokai) No. 2018-2116 discloses a vehicle control apparatus (hereinafter, referred to as a "prior-art apparatus") to calculate, in a case when a driver operates a brake pedal during the adaptive cruise control being executed, substantial (actual) braking force (actual braking force) acting on a vehicle based on controlled braking force by the adaptive cruise control and operation braking force by the brake pedal operation by the driver.

SUMMARY OF THE INVENTION

Net force acting on a vehicle is a sum of longitudinal force (front-rear force) and external force. The longitudinal force is a "sum of controlled braking force and controlled driving force applied on a vehicle by the vehicle control" or a "sum of the controlled braking force, the controlled driving force, and operation braking force or operation driving force based on a pedal operation by a driver". The external force is gradient force, resistance force, and so on. The gradient force is a component out of gravity acting on the vehicle traveling (or stopping) on a descending road or an ascending road, the component being parallel to these sloping roads. The gradient force with a positive value acts on the vehicle traveling (or stopping) on the descending road and the gradient force with a negative value acts on the vehicle traveling (or stopping) on the ascending road. Jerk of the vehicle may be calculated as a time differential value of the net force acting on the vehicle, while the external force generally does not change at a rapid pace. Therefore, it can be considered that a time differential value of the external force has a zero value in most cases. Hence, the jerk of the vehicle can be calculated as a time differential value of the longitudinal force. That is, a behavior of the vehicle related to the jerk varies depending on the longitudinal force. In a case when the driver performs a pedal operation during the vehicle control being executed, an immediate reflection of the pedal operation on a behavior of the longitudinal force enables the driver to feel that the vehicle behaves as the driver intended. However, a sufficient consideration (examination) has not been given concerning how to change the controlled driving force and the controlled braking force when the pedal operation is performed by the driver in a vehicle control apparatus to simultaneously change the controlled driving force and the controlled braking force. As a result, a situation where the pedal operation by the driver contradicts (does not match) with the behavior of the longitudinal force may arise, which may cause the driver to have uncomfortable feeling (a sense of discomfort).

For example, when the driver operates an accelerator pedal, expecting accelerating feeling to be maintained or increased in a situation where the controlled driving force and the controlled braking force are simultaneously applied, there may be a case where the acceleration feeling is moderated, depending on a behavior of the controlled braking force, which may cause the driver to have uncomfortable feeling. In such a case, it can be considered to change the behavior of the controlled driving force such that the accelerator pedal operation matches with a behavior of the longitudinal force to lessen the driver's uncomfortable feeling. Specifically, it can be considered to increase a time differential value of the controlled driving force at a "point in time at which the acceleration feeling is moderated" (that is, to increase a slope of a tangent line of the controlled driving force at this point in time). According to this configuration, a controlled driving force corresponding to an increased amount of the time differential value is added to the longitudinal force, and therefore moderation in the acceleration feeling at this point in time can be suppressed as well as the uncomfortable feeling of the driver can be lessened. However, this configuration may place a large burden on both of an actuator to change the controlled braking force and an actuator to change the controlled driving force because the controlled driving force which is force for accelerating the vehicle is newly added to the vehicle on which the controlled braking force which is force for decelerating the vehicle has been applied. Therefore, it has been desired to develop a technique to reduce a possibility of placing a burden on these actuators as well as to reduce a possibility that the behavior of the longitudinal force contradicts with the accelerator pedal operation.

The present invention is made to resolve the problem above. That is, one of objects of the present invention is to provide a vehicle control apparatus capable of reducing a possibility of placing a burden on actuators as well as reducing a possibility that the behavior of the longitudinal force contradicts with the accelerator pedal operation when a driver performs a accelerator pedal operation during execution of vehicle control.

A first vehicle control apparatus according to the present invention (hereinafter, also referred to as a "first invention apparatus") comprises;

vehicle control means for executing driving force control (S708, S1000 to S1008) to change controlled driving force which is driving force automatically applied on a vehicle and braking force control (S704, S900 to S928) to change controlled braking force which is braking force automatically applied on the vehicle so as to control an acceleration state and a deceleration state of the vehicle.

The first invention apparatus comprises;

detecting means (12) for detecting an operation amount of an accelerator operator operated by a driver; and operation driving force control means for adding operation driving force to the controlled driving force, the operation driving force becoming larger as the detected operation amount increases, and applying on the vehicle the controlled driving force, the operation driving force has been applied thereto, wherein, in a case where the vehicle control means determines, when braking force with a non-zero value is being applied by the braking force control, based on the operation amount, that an operation of the accelerator operator is initiated at a first timing (P1) and thereafter the operation amount continues to increase until a second specific timing (PP2) immediately before a second timing (P2) arrives to become constant at the second timing (P2), the vehicle control means is configured to;

execute the driving force control (S1006) in such a manner that a time differential value of the controlled driving force during a first period from the second timing (P2) to a first terminal timing (PP4) which is a timing after the second timing (P2) matches with a time differential value of the controlled driving force at the second specific timing (PP2); and execute the braking force control (S912, S916, S920) in such a manner that a time differential value of the controlled braking force during the first period becomes a value more than or equal to a sum of a time differential value of the controlled braking force at the second specific timing (PP2) and a time differential value of the operation driving force at the second specific timing (PP2).

In a conventional vehicle control apparatus, when an accelerator pedal operation is performed by the driver during the execution of the vehicle control (the driving support control or the automatic driving control), it is likely that an acceleration feeling of the vehicle is moderated or a deceleration feeling of the vehicle is increased at the second timing (the timing at which increase in the operation amount of the accelerator pedal is stopped to become constant).

Specific description will be made below. Assuming that a sum of the controlled driving force (driving force applied by the driving force control), the controlled braking force (braking force applied by the braking force control), and the operation driving force (driving force which becomes larger as the operation amount of the accelerator pedal increases) is first longitudinal force, a behavior of the vehicle varies, depending on the first longitudinal force. The operation of the accelerator pedal is initiated at the first timing and the operation amount thereof continues to increase until the second specific timing (the timing immediately before the second timing) arrives to become constant at the second timing. Therefore, a time differential value of the operation driving force becomes a positive value at the second specific timing and becomes a zero value at the second timing. That is, a time differential value of the operation driving force decreases over a period from the second specific timing to the second timing. Hereinafter, a time differential value will be also simply referred to as a "differential value".

Therefore, in a case when differential values of the controlled driving force and the controlled braking force are both constant over the period from the second specific timing to the second timing, a differential value of the first longitudinal force at the second timing decreases from a differential value of the first longitudinal force at the second specific timing. This means that the jerk of the vehicle decreases over the period from the second specific timing to the second timing. In other words, this means that the acceleration feeling is moderated when the vehicle is accelerating and the deceleration feeling is increased when the vehicle is decelerating.

During a period from a timing at which the driver has started the operation of the accelerator pedal (the first timing) to a specific timing immediately before a timing at which the operation amount of the accelerator pedal starts to decrease, it can be considered that the driver expects the acceleration feeling of the vehicle to be maintained or increased or the deceleration feeling of the vehicle to be maintained or moderated. Therefore, if the acceleration feeling of the vehicle is moderated or the deceleration feeling of the vehicle is increased as mentioned above during the "period from the second specific timing to the second timing" which is halfway through the above-mentioned period (the period from the first timing to the specific timing), the driver feels a sense of discomfort because the accelerator pedal operation does not match with a behavior of the first longitudinal force.

In contrast, in the first invention apparatus, the vehicle control means executes the driving force control in a case where the accelerator pedal operation has been performed when braking force with a non-zero value is being applied by the braking force control in such a manner that a differential value of the controlled driving force during the first period from the second timing to the first terminal timing which is a timing after the second timing matches with a differential value of the controlled driving force at the second specific timing (That is, differential values of the controlled driving force are maintained constant from the second specific timing to the first terminal timing.). In addition, the vehicle control means executes the braking force control in such a manner that a differential value of the controlled braking force during the first period becomes a value more than or equal to a sum of a differential value of the controlled braking force at the second specific timing and a differential value of the operation driving force at the second specific timing. That is, the vehicle control means intentionally increases a differential value of the controlled braking force during the first period compared to a differential value of the controlled braking force at the second specific timing. Here, when the operation amount of the accelerator pedal has been constant during a period from the second timing to the specific timing immediately before the timing at which this operation amount starts to decrease (Hereinafter, this period will be referred to as a "first operation amount constant period".), a differential value of the operation driving force becomes a zero value during the first operation amount constant period, not only at the second timing.

In this case, according to the first invention apparatus, a differential value of the first longitudinal force during a "period where the first period and the first operation amount constant period overlap with each other (hereinafter, also simply referred to as a "first overlap period")" becomes a value more than or equal to a differential value of the first longitudinal force at the second specific timing. This means that the jerk of the first longitudinal force is maintained or increased at the second timing and that this maintained or increased jerk thereafter will be maintained until the first overlap period is finished. In other words, this means that the acceleration feeling is maintained or increased at the second timing when the vehicle is accelerating and the deceleration feeling is maintained or moderated at the second timing when the vehicle is decelerating. According to this configuration, the accelerator pedal operation matches with a behavior of the first longitudinal force during a period from the second specific timing to the end of the first overlap period, which enables the driver to feel that the vehicle behaves as the driver intended.

Besides, in the first invention apparatus, the vehicle control means increases a "differential value of the controlled braking force" not a "differential value of the controlled driving force" during the first period. According to this configuration, it becomes possible to reduce a burden on the actuators compared to a configuration where a "differential value of the controlled driving force" during the first period is increased.

As stated above, according to the first invention apparatus, a possibility of placing a burden on the actuators can be reduced as well as a possibility that the behavior of the first longitudinal force contradicts with the accelerator pedal operation can be reduced.

In another aspect of the present invention, in a case where the vehicle control means determines, when braking force with a non-zero value is being applied by the braking force control, that the operation amount starts to decrease from a third timing (P3) which is a timing after the second timing (P2) and thereafter continues to decrease until a fourth specific timing (PP4) immediately before a fourth timing (P4) arrives to become constant at the fourth timing (P4), the vehicle control means is configured to;

execute the driving force control (S1006) in such a manner that a time differential value of the controlled driving force during a second period from the fourth timing (P4) to a second terminal timing (E1) which is a timing after the fourth timing (P4) matches with a time differential value of the controlled driving force at the fourth specific timing (PP4); and execute the braking force control (S924, S926, and S928, S916) in such a manner that a time differential value of the controlled braking force during the second period becomes a value less than or equal to a sum of a time differential value of the controlled braking force at the fourth specific timing (PP4) and a time differential value of the operation driving force at the fourth specific timing (PP4).

In the conventional vehicle control apparatus, when the accelerator pedal operation is performed by the driver during the execution of the vehicle control, it is likely that the acceleration feeling of the vehicle is increased or the deceleration feeling of the vehicle is moderated at the fourth timing. That is, the operation driving force decreases from the third timing to the fourth specific timing which is a timing immediately before the fourth timing and becomes constant at the fourth timing. Therefore, a differential value of the operation driving force becomes a negative value at the fourth specific timing and becomes a zero value at the fourth timing. That is, a differential value of the operation driving force increases over a period from the fourth specific timing to the fourth timing.

Therefore, in a case when differential values of the controlled driving force and the controlled braking force are both constant over the period from the fourth specific timing to the fourth timing, a differential value of the first longitudinal force at the fourth timing increases from a differential value of the first longitudinal force at the fourth specific timing. This means that the jerk of the vehicle increases over the period from the fourth specific timing to the fourth timing. In other words, this means that the acceleration feeling is increased when the vehicle is accelerating and the deceleration feeling is moderated when the vehicle is decelerating.

During a period from a timing at which the operation amount of the accelerator pedal starts to decrease (the third timing, in other words, a timing at which the driver releases the accelerator pedal) to a timing at which the operation amount of the accelerator pedal stops decreasing and becomes constant or a zero value (the fourth timing), it can be considered that the driver expects the acceleration feeling of the vehicle to be maintained or moderated and the deceleration feeling of the vehicle to be maintained or increased. Therefore, if the acceleration feeling of the vehicle is increased or the deceleration feeling of the vehicle is moderated as mentioned above during the "period from the fourth specific timing to the fourth timing" which is halfway through the above-mentioned period (the period from the third timing to the fourth timing), the driver feels a sense of discomfort because the accelerator pedal operation does not match with a behavior of the first longitudinal force.

In contrast, in the first invention apparatus, the vehicle control means executes the driving force control in a case where the accelerator pedal operation has been performed when braking force with a non-zero value is being applied by the braking force control in such a manner that a differential value of the controlled driving force during the second period from the fourth timing to the second terminal timing which is a timing after the fourth timing matches with a differential value of the controlled driving force at the fourth specific timing (That is, differential values of the controlled driving force are maintained constant from the fourth specific timing to the second terminal timing.). In addition, the vehicle control means executes the braking force control in such a manner that a differential value of the controlled braking force during the second period becomes a value less than or equal to a sum of a differential value of the controlled braking force at the fourth specific timing and a differential value of the operation driving force at the fourth specific timing. That is, the vehicle control means intentionally decreases a differential value of the controlled braking force during the second period compared to a differential value of the controlled braking force at the fourth specific timing. Here, when the operation amount of the accelerator pedal has been constant during a period from the fourth timing to a timing immediately before a timing at which the operation amount of the accelerator pedal increases or decreases again (Hereinafter, this period will be referred to as a "second operation amount constant period"), a differential value of the operation driving force becomes a zero value during the second operation amount constant period, not only at the fourth timing.

In this case, according to the first invention apparatus, a differential value of the first longitudinal force during a "period where the second period and the second operation amount constant period overlap with each other (hereinafter, also simply referred to as a "second overlap period")" becomes a value less than or equal to a differential value of the first longitudinal force at the fourth specific timing. This means that the jerk of the first longitudinal force is maintained or decreased at the fourth timing and that this maintained or decreased jerk thereafter will be maintained until the second overlap period is finished. In other words; this means that the acceleration feeling is maintained or moderated at the fourth timing when the vehicle is accelerating and the deceleration feeling is maintained or increased at the fourth timing when the vehicle is decelerating. According to this configuration, the accelerator pedal operation matches with a behavior of the first longitudinal force during a period from the fourth specific timing to the end of the second overlap period, which enables the driver to feel that the vehicle behaves as the driver intended. Hence, a possibility that the behavior of the first longitudinal force contradicts with the accelerator pedal operation can be further reduced.

A second vehicle control apparatus according to the present invention (hereinafter, also referred to as a "second invention apparatus") comprises;

vehicle control means for executing driving force control (S708, S1000 to S1008) to change controlled driving force which is driving force automatically applied on a vehicle and braking force control (S1500 to S1524) to change controlled braking force which is braking force automatically applied on the vehicle so as to control an acceleration state and a deceleration state of the vehicle.

The second invention apparatus comprises;

detecting means (12) for detecting an operation amount of an accelerator operator operated by a driver, wherein, in a case where the vehicle control means determines, when braking force with a non-zero value is being applied by the braking force control, based on the operation amount, that an operation of the accelerator operator is initiated at a first timing (P1) and thereafter the operation amount continues to increase until a second specific timing (PP2) immediately before a second timing (P2) arrives to become constant at the second timing (P2), the vehicle control means is configured to;

execute the driving force control (S1006) in such a manner that a time differential value of the controlled driving force during a third period from the first timing (P1) to a third terminal timing (PP3) which is a timing after the first timing (P1) matches with a time differential value of the controlled driving force at a first specific timing (PP1) immediately before the first timing (P1); and execute the braking force control (S1506, S1510, S1514) in such a manner that a time differential value of the controlled braking force during the third period becomes a value larger than a time differential value of the controlled braking force at the first specific timing (PP1).

In the second invention apparatus, in a case where the accelerator pedal operation has been performed by the driver during the execution of the vehicle control, the vehicle control means executes the driving force control in such a manner that a differential value of the controlled driving force during the third period from the first timing to the third terminal timing which is a timing after the first timing matches with a differential value of the controlled driving force at the first specific timing (That is, differential values of the controlled driving force are maintained constant from the first specific timing to the third terminal timing.). In addition, the vehicle control means executes the braking force control in such a manner that a differential value of the controlled braking force during the third period becomes a value larger than a differential value of the controlled braking force at the first specific timing. That is, the vehicle control means intentionally increases a differential value of the controlled braking force during the third period compared to a differential value of the controlled braking force at the first specific timing.

Assuming that a sum of the controlled driving force and the controlled braking force is a "second longitudinal force", a behavior of the vehicle in the second invention apparatus does not depend on the operation driving force but varies depending on the second longitudinal force, Therefore, according to the above configuration, a differential value of the second longitudinal force during the third period becomes larger than a differential value of the second longitudinal force at the first specific timing. This means that the jerk of the second longitudinal force is increased at the first timing and that this increased jerk thereafter will be maintained until the third period is finished. In other words, this means that the acceleration feeling is increased at the first timing when the vehicle is accelerating and the deceleration feeling is moderated at the first timing when the vehicle is decelerating. The driver initiates the operation of the accelerator pedal, expecting the acceleration feeling of the vehicle to be increased or the deceleration feeling of the vehicle to be moderated at the first timing. Thus, according to a configuration of the second invention apparatus, the accelerator pedal operation matches with a behavior of the second longitudinal force during a period from the first specific timing to the third terminal timing, which enables the driver to feel that the vehicle behaves as the driver intended.

Now, the behavior of the second longitudinal force stated above can be realized by a following configuration as well, That is, this behavior can be realized by a "configuration (hereinafter, also referred to as a "first configuration") where the braking force control is executed in such a manner that a differential value of the controlled braking force during the third period matches with a differential value of the controlled braking force at the first specific timing, and instead, the driving force control is executed in such a manner that a differential value of the controlled driving force during the third period becomes a value larger than a differential value of the controlled driving force at the first specific timing". However, the first configuration has a problem that there is a possibility of placing a large burden on both of the actuator to change the controlled braking force and the actuator to change the controlled driving force because the controlled driving force acting as the force to accelerate the vehicle (specifically, the controlled driving force corresponding to an increase amount of a differential value) is to be newly added to the vehicle on which the controlled braking force is being applied.

In contrast, in the second invention apparatus, the vehicle control means increases a "differential value of the controlled braking force" not a "differential value of the controlled driving force" during the third period. Since the controlled braking force is a negative value, the larger a differential value thereof becomes, the smaller a magnitude itself of the controlled braking force becomes compared to a configuration where a differential value is constant. Therefore, according to the second invention apparatus, both magnitudes of the controlled driving force and the controlled braking force applied on the vehicle during the third period can be reduced compared to the first configuration. Hence, according to the second invention apparatus, a burden on the actuators can be reduced compared to the first configuration.

As stated above, according to the second invention apparatus, a possibility of placing a burden on the actuators can be reduced as well as a possibility that the behavior of the second longitudinal force contradicts with the accelerator pedal operation can be reduced.

In another aspect of the present invention, in a case where the vehicle control means determines, when braking force with a non-zero value is being applied by the braking force control, that the operation amount starts to decrease from a third timing (P3) which is a timing after the second timing (P2), the vehicle control means is configured to;

execute the driving force control (S1006) in such a manner that a time differential value of the controlled driving force during a fourth period from the third timing (P3) to a fourth terminal timing (E2) which is a timing after the third timing (P3) matches with a time differential value of the controlled driving force at a third specific timing (PP3) immediately before the third timing (P3); and execute the braking force control (S1520, S1522, S1524) in such a manner that a time differential value of the controlled braking force during the fourth period becomes a value less than a time differential value of the controlled braking force at the third specific timing (PP3).

In the second invention apparatus, when the accelerator pedal operation has been performed by the driver during the execution of the vehicle control, the vehicle control means executes the driving force control in such a manner that a differential value of the controlled driving force during the fourth period from the third timing to the fourth terminal timing which is a timing after the third timing matches with a differential value of the controlled driving force at the third specific timing (That is, differential values of the controlled driving force are maintained constant from the third specific timing to the fourth terminal timing.). In addition, the vehicle control means executes the braking force control in such a manner that a differential value of the controlled braking force during the fourth period becomes a value smaller than a differential value of the controlled braking force at the third specific timing. That is, the vehicle control means intentionally decreases a differential value of the controlled braking force during the fourth period compared to a differential value of the controlled braking force at the third specific timing.

According to this configuration, a differential value of the second longitudinal force during the fourth period becomes smaller than a differential value of the second longitudinal force during the third specific timing. This means that the jerk of the second longitudinal force is decreased at the third timing and that this decreased jerk thereafter will be maintained until the fourth period is finished. In other words, this means that the acceleration feeling is moderated at the third timing when the vehicle is accelerating and the deceleration feeling is increased at the third timing when the vehicle is decelerating. The driver initiates releasing the accelerator pedal at the third timing, expecting the acceleration feeling of the vehicle to be moderated or the deceleration feeling of the vehicle to be increased. Therefore, according to the configuration of the second invention apparatus, the accelerator pedal operation matches with a behavior of the second longitudinal force during a period from the third specific timing to the fourth terminal timing, which enables the driver to feel that the vehicle behaves as the driver intended.

Now, the behavior of the second longitudinal force stated above can be realized by a following configuration as well. That is, this behavior can be realized by a "configuration (hereinafter, also referred to as a "second configuration") where the braking force control is executed in such a manner that a differential value of the controlled braking force during the fourth period matches with a differential value of the controlled braking force at the third specific timing, and instead, the driving force control is executed in such a manner that a differential value of the controlled driving force during the fourth period becomes a value smaller than a differential value of the controlled driving force at the third specific timing". The second configuration is adopted along with the above-mentioned first configuration. In the second configuration, although a differential value of the controlled driving force is decreased at the third timing, a differential value of the controlled driving force is increased at the first timing by the first configuration, and therefore a possibility that a "magnitude of the controlled driving force based on the second configuration during the fourth period" becomes smaller than a "magnitude of the controlled driving force based on the configuration of the second invention apparatus during the fourth period" is extremely low. Therefore, the second configuration has a problem that there is a possibility of placing a large burden on the actuators because the controlled driving force is newly added to the vehicle on which the controlled braking force is being applied.

In contrast, in the second invention apparatus, the vehicle control means decreases a "differential value of the controlled braking force" not a "differential value of the controlled driving force" during the fourth period. Since the controlled braking force is a negative value, the smaller a differential value thereof becomes, the larger a magnitude itself of the controlled braking force becomes compared to a configuration where a differential value is constant. However, in the second invention apparatus, a differential value of the controlled braking force increases at the first timing and therefore a possibility that a "magnitude of the controlled braking force based on the configuration of the second invention apparatus during the fourth period" becomes larger than a "magnitude of the controlled braking force based on the second configuration" is extremely low. That is, according to the configuration of the second invention apparatus, both magnitudes of the controlled driving force and the controlled braking force applied on the vehicle during the fourth period can be reduced compared to the second configuration, which makes it possible to reduce a burden on the actuators.

As stated above, according to the second invention apparatus, a possibility of placing a burden on the actuators can be reduced as well as a possibility that the behavior of the second longitudinal force contradicts with the accelerator pedal operation can be reduced.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT (First Embodiment)

Figure 1:
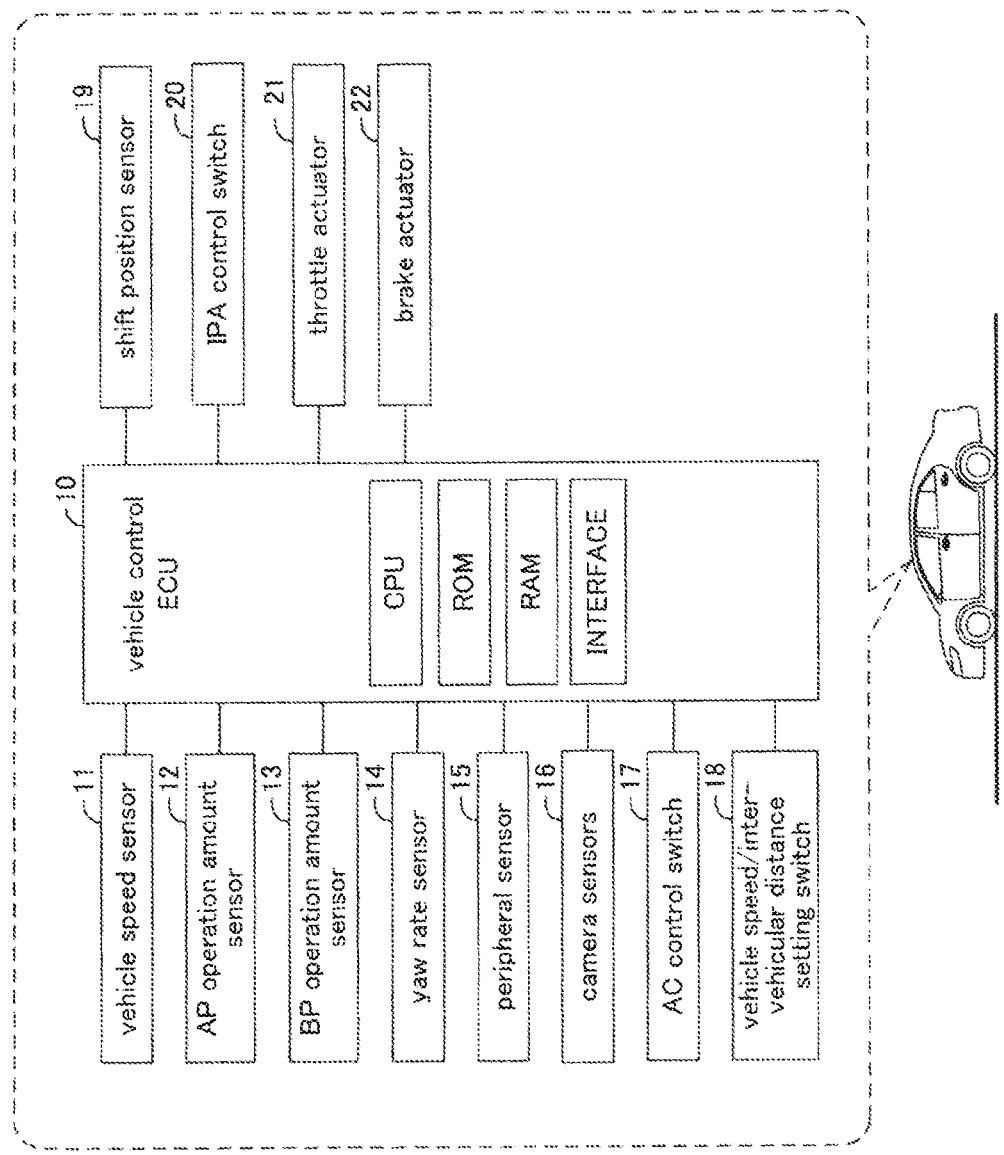
FIG. 1 is a diagram showing a vehicle control apparatus according to a first embodiment of the present invention (hereinafter, referred to as a "first embodiment apparatus") and a vehicle to which the first embodiment apparatus is applied.

Hereinafter, a vehicle control apparatus according to a first embodiment of the present invention (hereinafter, also referred to as a "first embodiment apparatus") will be described, referring to figures. The first embodiment apparatus is applied to a vehicle shown in FIG. 1. As shown in FIG. 1, the first embodiment apparatus comprises a vehicle control ECU 10 (hereinafter, also simply referred to as "ECU 10").

ECU is an abbreviation of Electric Control Unit and is an electronic control circuit comprising a microcomputer as a main component parts, the microcomputer including CPU, ROM, RAM, interfaces, and the like. The CPU realize/perform various functions (mentioned later) by executing instructions routines) stored in the ROM.

<Specific Configuration of the First Embodiment Apparatus>

A specific configuration of the first embodiment apparatus will be described. Following sensors and switches are connected to the ECU 10, the sensors and the switches being a vehicle speed sensor 11, an accelerator pedal operation amount sensor 12, a brake pedal operation amount sensor 13, a yaw rate sensor 14, a peripheral sensor 15, a camera sensor 16, an adaptive cruise control switch 17, a vehicle speed/inter-vehicular distance setting switch 18, a shift position sensor 19, an intelligent parking assist control switch 20, a throttle actuator 21, and a brake actuator 22. The ECU 10 receives signals output from these sensors 11 to 16, 19 and these switches 17, 18, 20 every time a predetermined calculation interval elapses to operate the actuators 21 and 22. Hereinafter, the adaptive cruise control switch 17 will be referred to as an "AC control switch 17" and the intelligent parking assist control switch 20 will be referred to as an "IPA control switch 20", It should be noted that the vehicle comprises, other than the above-mentioned sensors, a plurality of sensors for detecting a driving state of the vehicle. However, in the present embodiment, sensors related to a configuration of the vehicle control apparatus disclosed in the present specification will be only described.

The vehicle speed sensor 11 detects a speed of the vehicle (vehicle speed) to output to the ECU 10 a signal indicating the vehicle speed.

The accelerator pedal operation amount sensor 12 detects an operation amount of an accelerator pedal (illustration omitted) to output to the ECU 10 a signal indicating the operation amount (hereinafter, referred to as an "accelerator pedal operation amount").

The brake pedal operation amount sensor 13 detects an operation amount of a brake pedal (illustration omitted) to output to the ECU 10 a signal indicating the operation amount (hereinafter, referred to as a "brake pedal operation amount").

The yaw rate sensor 14 detects an angular speed (yaw rate) of the vehicle to output to the ECU 10 a signal indicating the yaw rate.

Figure 2:
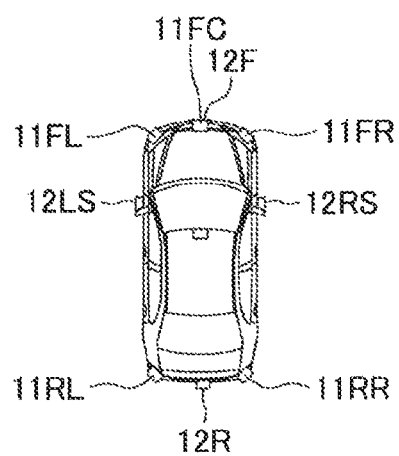
FIG. 2 is a plan view showing positions at which a peripheral sensor and camera sensors are arranged.

The peripheral sensor 15 comprises, as shown in FIG. 2, a front center peripheral sensor 15FC, a front right peripheral sensor 15FR, a front left peripheral sensor 15FL, a rear right peripheral sensor 15RR, and a rear left peripheral sensor 15RL. Each of the peripheral sensors 15FC, 15FR, 15FL, 15RR, 15RL is a radar sensor. Although these sensors have different detection regions, they basically have same configurations with each other.

The peripheral sensor 15 comprises a radar transmission/reception part and a signal processing part (illustration omitted). The radar transmission/reception part emits an electric wave in a millimeter waveband (hereinafter, referred to as a "millimeter wave"), and receives a millimeter wave (i.e., a reflected wave) reflected from a three-dimensional object which is present in the emitted area (for example, an other vehicle, a pedestrian, a bicycle, a building, and the like). The signal processing part obtains information (hereinafter, referred to as "peripheral information") indicating a distance between the vehicle and the three-dimensional object, a relative speed between the vehicle and the three-dimensional object, a relative position (direction) of the three-dimensional object with respect to the vehicle, and the like and outputs to the ECU 10. The signal processing part obtains the peripheral information based on a phase difference between the transmitted millimeter wave and the received reflected wave, an attenuation level of the reflected wave, a time from a point in time of transmitting the millimeter wave to a point in time of receiving the reflected wave, or the like.

The front center peripheral sensor 15FC is provided at a front center part of a vehicle body and detects a three-dimensional object existing in a front region of the vehicle. The front right peripheral sensor 15FR is provided at a front right corner part of the vehicle body and mainly detects a three-dimensional object existing in a front right region of the vehicle. The front left peripheral sensor 15FL is provided at a front left corner part of the vehicle body and mainly detects a three-dimensional object existing in a front left region of the vehicle. The rear right peripheral sensor 15RR is provided at a rear right corner part of the vehicle body and mainly detects a three-dimensional object existing in a rear right region of the vehicle. The rear left peripheral sensor 15RL is provided at a rear left corner part of the vehicle body and mainly detects a three-dimensional object existing in a rear left region of the vehicle.

It should be noted that although a radar sensor is used as the peripheral sensor 15 in the present embodiment, for example, a clearance sonar, a lidar sensor, or the like may be adopted instead.

The camera sensors 16 comprise a front camera sensor 16F, a right lateral camera sensor 16RS, a left lateral camera sensor 16LS, and a rear camera sensor 16R. Each of the camera sensors 16F, 16RS, 16LS, 16R is a sensor comprising a camera part to image the surrounding region. Although these sensors have different imaging ranges (regions), they basically have same configurations with each other.

The front camera sensor 16F is provided at the front center part of the vehicle body, and images the front region of the vehicle. The right lateral camera sensor 16RS is provided at a right side mirror, and images a right lateral region of the vehicle. The left lateral camera sensor 16LS is provided at a left side mirror, and images a left lateral region of the vehicle. The rear camera sensor 16R is provided at a rear center part of the vehicle body, and images the rear region of the vehicle. These image data obtained by each of the camera sensors 16F, 16RS, 16LS, 16R is output to the ECU 10.

The ECU 10 fuses the peripheral information obtained from the peripheral sensor 15 and the image data of an object obtained from the camera sensors 16 to create a fusion object. In addition, the ECU 10 stores data in the memory (ROM) in advance, the data being data where objects such as vehicles, pedestrians, bicycles, and the like have been patterned and performs, using this data, a pattern matching for the image data obtained from the camera sensors 16 to thereby identify which of the vehicles, the pedestrians, and the bicycles the object indicated by this image data corresponds to. This configuration enables the ECU 10 to determine whether or not there is a preceding vehicle (i.e., a vehicle existing in front of the vehicle on a same traffic lane as the vehicle) in front of the vehicle.

Besides, the ECU 10 composites the image data obtained by each of the camera sensors 16F, 16RS, 16LS, 16R and a plane image of the vehicle stored in the memory in advance at a same scale to create a bird's-eye view image. Further, the ECU 10 creates, based on the image data obtained by the front camera sensor 16F and the rear camera sensor 16R, a traveling direction image indicating a region in a traveling direction of the vehicle. The ECU 10 displays on a display screen the bird's-eye view image and the traveling direction image during parking assist control (mentioned later) being executed. This configuration enables the driver to refer to these images on the display screen during the control being executed.

Referring back to FIG. 1, the AC control switch 17 is arranged in the vicinity of a driver's seat and is operated by the driver. The AC control switch 17 is a switch to be pressed when initiating execution of the adaptive cruise control (hereinafter, referred to as an "AC control"). Here, the AC control is a known control to make the vehicle travel at a constant speed of a set speed set in advance when there is no preceding vehicle in front of the vehicle and when there exists a preceding vehicle, to accelerate or decelerate the vehicle so as to trail the preceding vehicle, maintaining a set inter-vehicular distance set in advance.

When the AC control switch 17 is turned on, a signal is output to the ECU 10, the signal being for switching a traveling mode of the vehicle to a constant speed traveling mode or a trailing mode (Both will be mentioned later.). At this time, a state of the AC control switch 17 changes from an off state to an on state and continues to output to the ECU 10 a signal indicating that the switch 17 is in the on state while the switch 17 is being turned on. Now, the constant speed traveling mode is a traveling mode selected by the AC control switch 17 being turned on when there is no preceding vehicle. The trailing mode is a traveling mode selected by the AC control switch 17 being turned on when a preceding vehicle exists. When the AC control switch 17 is turned off, a signal is output to the ECU 10, the signal being for switching the traveling mode of the vehicle to a normal traveling mode. At this time, a state of the AC control switch 17 changes from the on state to the off state and continues to output to the ECU 10 a signal indicating that the switch 17 is in the off state while the switch 17 is being turned off.

The vehicle speed/inter-vehicular distance setting switch 18 is arranged in the vicinity of the driver's seat and is operated by the driver. The vehicle speed/inter-vehicular distance setting switch 18 is adjusted and a vehicle speed and an inter-vehicular distance is set, and thereby this vehicle speed and this inter-vehicular distance are output to the ECU 10 as signals indicating a set vehicle speed and a set inter-vehicular distance, respectively. Here, the set vehicle speed is a vehicle speed maintained by the vehicle when the traveling mode of the vehicle is the constant speed traveling mode, and the set inter-vehicular distance is an inter-vehicular distance to a preceding vehicle at a vehicle speed less than or equal to the set vehicle speed when the traveling mode of the vehicle is the trailing mode. When the traveling mode of the vehicle is the constant speed traveling mode, the ECU 10 calculates a target acceleration to travel at a vehicle speed less than or equal to the set vehicle speed. When the traveling mode of the vehicle is the trailing mode, the ECU 10 calculates a target acceleration to trail a preceding vehicle at a vehicle speed less than or equal to the set vehicle speed, maintaining the set inter-vehicular distance. It should be noted that a configuration where an inter-vehicular time is set instead of the inter-vehicular distance may be adopted. In this case, the set inter-vehicular distance can be calculated by multiplying a set inter-vehicular time with the vehicle speed.

The shift position sensor 19 detects a shift position of a shift lever (illustration omitted) and outputs to the ECU 10 a signal indicating the shift position.

The IPA control switch 20 is arranged in the vicinity of the driver's seat and is operated by the driver. The IPA switch 20 is a switch pressed when initiating execution of a parking assist control. Here, the parking assist control is a known control to assist the driver in a parking operation (or an operation to leave a parking space) by automatically steering a steering wheel when parking the vehicle or leaving the parking space. The parking assist control assists three types of parking and leaving a parking space, that is, a side-by-side parking, a parallel parking, and a leaving a parallel parking space. In the parking assist control to assist the parking of the vehicle, when a parking space for the vehicle is determined based on the peripheral information, the ECU 10 determines a path from a current position of the vehicle to the parking space to calculate a target vehicle speed for traveling along this path. In the parking assist control to assist the leaving of a parking space, the ECU 10 determines a path from the current position of the vehicle to a position at which the vehicle finishes leaving the parking space to calculate a target vehicle speed for traveling along this path.

When the IPA control switch 20 is pressed, an IPA pressed signal is transmitted to the ECU 10. On reception of the IPA pressed signal from the IPA control switch 20, the ECU 10 determines a type of a control for the assist based on a shift position detected by the shift position sensor 19, a vehicle speed detected by the vehicle speed sensor 11, the number of receiving times of the IPA pressed signal during a predetermined period of time. Specifically, in a case when a shift position is D or N and a vehicle speed is less than or equal to a predetermined vehicle speed (30 [km/h], for example), the ECU 10 initiates assisting of the side-by-side parking when the IPA control switch 20 is pressed once and the ECU 10 initiates assisting of the parallel parking when the IPA control switch 20 is pressed twice. On the other hand, in a case when the IPA control switch 20 is pressed once when a shift position is P, the ECU 10 initiates assisting of the leaving of a parallel parking space.

The throttle actuator 21 is a known actuator for changing a throttle valve opening by driving a throttle valve provided at an engine intake duct of the vehicle. The throttle actuator 21 generates driving force for the vehicle by changing the throttle valve opening in response to an instruction from the ECU 10.

During the AC control being executed, the ECU 10 controls the throttle actuator 21 (and the brake actuator 22) in such a manner that an acceleration of the vehicle matches with a target acceleration, whereas during the parking assist control being executed, the ECU 10 controls the throttle actuator 21 (and the brake actuator 22) in such a manner that a vehicle speed matches with a target vehicle speed. In this way, driving force is applied on the vehicle. This driving force is applied by the AC control or the parking assist control. Therefore, hereinafter, this driving force will be also referred to as "controlled driving force", and a control to apply the controlled driving force will be also referred to as a "driving force control". In addition, the AC control and the parking assist control will be collectively referred to as a "vehicle control".

Besides, the ECU 10 controls the throttle actuator 21 based on the accelerator pedal operation amount detected by the accelerator pedal operation amount sensor 12 and driving state amounts (an engine rotating speed, for example) detected by other engine state amount sensors (illustration omitted) of the vehicle. In this way, driving force is applied on the vehicle. This driving force is generated by the accelerator pedal operation by the driver. Therefore, hereinafter, this driving force will be referred to as "operation driving force".

The brake actuator 22 is provided in a hydraulic circuit between a master cylinder to compress operating fluid with a depression force of the brake pedal and a friction brake mechanism provided at each of front and rear wheels of the vehicle. Each of the friction brake mechanism operates a wheel cylinder with operating fluid supplied from the brake actuator 22, and thereby presses a corresponding brake pad onto a corresponding brake disc provided at each of the front and rear wheels to generate a hydraulic braking force. The brake actuator 22 is a known actuator for adjusting a hydraulic pressure supplied to the wheel cylinder, and supplies to the wheel cylinder a hydraulic pressure in response to an instruction from the ECU 10 to generate braking force for each of the wheels. It should be noted that the braking force is defined as a negative value in the present specification. Thus, a magnitude itself of the braking force becomes larger as a value of the braking force decreases, and the magnitude itself of the braking force becomes smaller as the value of the braking force increases.

During the AC control being executed, the ECU 10 controls the brake actuator 22 (and the throttle actuator 21) in such a manner that an acceleration of the vehicle matches with a target acceleration, whereas during the parking assist control being executed, the ECU 10 controls the brake actuator 22 (and the throttle actuator 21) in such a manner that a vehicle speed matches with a target vehicle speed. In this way, braking force is applied on the vehicle. This braking force is applied by the vehicle control (the AC control or the parking assist control). Therefore, hereinafter, this braking force will be also referred to as "controlled braking force", and a control to apply the controlled braking force will be also referred to as a "braking force control".

Besides, the ECU 10 controls the brake actuator 22 based on the brake pedal operation amount detected by the brake pedal operation amount sensor 13 and driving state amounts detected by other driving state amount sensors (illustration omitted) of the vehicle. In this way, braking force is applied on the vehicle.

<Operation Detail of the First Embodiment Apparatus>

In a case when an accelerator pedal operation amount with a non-zero value is detected in the midst of the controlled driving force and the controlled braking force are simultaneously being applied on the vehicle by the vehicle control, the operation driving force is further applied on the vehicle. When defining a sum of the controlled driving force, the controlled braking force, and the operation driving force as a "first longitudinal force", a net force acting on the vehicle becomes a sum of the first longitudinal force and external force (gradient force, resistance force, and the like). Therefore, which state the vehicle is in at the current point in time among an accelerating state, a decelerating state, and a constant speed state depends on a sign of this net force. That is, the vehicle is in the accelerating state when the net force acting on the vehicle has a positive value, the vehicle is in the decelerating state when the net force acting on the vehicle has a negative value, and the vehicle is in the constant speed state when the net force acting on the vehicle has a zero value.

Jerk of the vehicle may be calculated as a time differential value (hereinafter, also simply referred to as a "differential value") of the net force acting on the vehicle, while the external force generally does not change at a rapid pace. Therefore, it can be considered that a differential value of the external force has a zero value in most cases. Hence, the jerk of the vehicle can be calculated as a differential value of the first longitudinal force. Accordingly, when the differential value of the first longitudinal force changes due to a change in at least one of the forces constituting the first longitudinal force, that is, the controlled driving force, the controlled braking force, and the operation driving force, an acceleration feeling or a deceleration feeling of the vehicle changes. In the following, a description will be made, taking four cases as examples, the description being about operation detail of the first embodiment apparatus in a case when an accelerator pedal operation amount with a non-zero value is detected in the midst of the controlled driving force and the controlled braking force (in more detail, the controlled braking force with a non-zero value) are simultaneously being applied on the vehicle by the vehicle control.

Case A: Case where the Vehicle Starts by the AC Control

Figure 3:
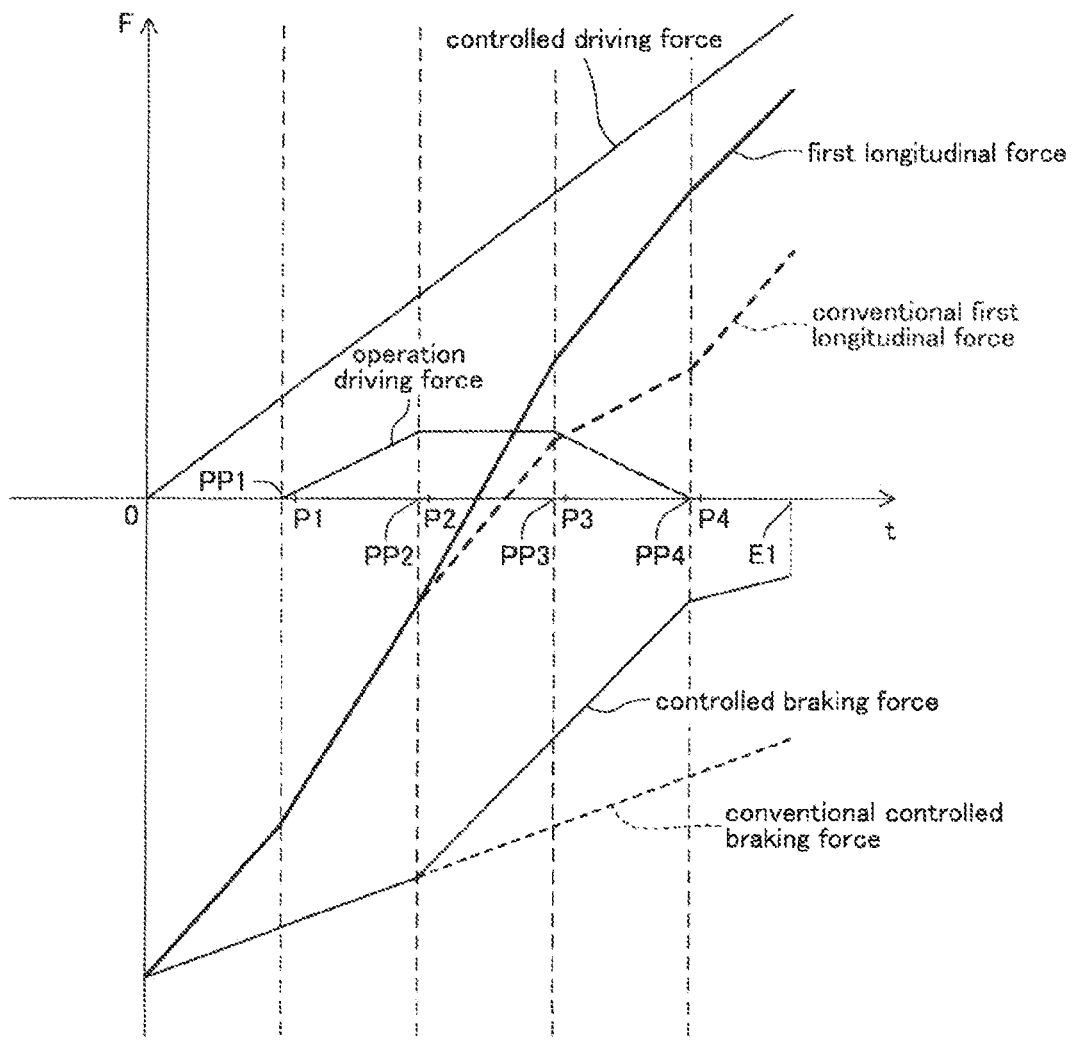
FIG. 3 is a time chart showing a time transition of each force acting on the vehicle in a case when an accelerator pedal operation has been performed during execution of AC control (case A).

FIG. 3 is a time chart showing a time transition of each force acting on the vehicle in a case A. The AC control of the first embodiment apparatus has a "trailing control function covering the whole vehicle speed". The trailing control function covering the whole vehicle speed is a function to stop the vehicle when a preceding vehicle stops and after the preceding vehicle starts, to resume the trailing by the driver pressing the AC control switch 17 or performing the accelerator pedal operation. The present case assumes a situation where the vehicle stops by the AC control because a preceding vehicle stops during the execution of the AC control at the trailing mode and thereafter the preceding vehicle starts, and further assumes a case where "the vehicle starts on a horizontal road by the driver pressing the AC control switch 17" under the situation mentioned above. As shown in FIG. 3, when the AC control switch 17 is pressed (t=0) during the vehicle being in a stopping state, the first embodiment apparatus decreases the controlled braking force as well as increases the controlled driving force to start the vehicle (Hereinafter, such a control will be referred to as a "shifting control"). This enables the vehicle to start in a smooth manner. Especially, in a case when the vehicle starts on an ascending road, the vehicle can start without slipping downward.

In the present case, the driver operates the accelerator pedal in the midst of the shifting control for a purpose of increasing the acceleration feeling at a start timing. As shown in FIG. 3, the accelerator pedal operation is initiated at a timing P1. Here, "the accelerator pedal operation is initiated" means that an accelerator pedal operation amount with a positive value is detected in the midst of a period where the accelerator pedal operation amount continues to be zero. In the present case, the accelerator pedal operation amount with a zero value is detected from a timing at which the AC control switch 17 is pressed to a timing PP1 which is an immediately previous timing of the timing P1 (i.e., an immediately previous period), and at the timing P1, the accelerator pedal operation amount with a positive value is first detected. The accelerator pedal operation amount increases from the timing P1 to a timing PP2 which is a timing immediately before a timing P2. The accelerator pedal operation amount remains unchanged from the timing P2 to a timing PP3 which is a timing immediately before a timing P3, decreases from the timing P3 to a timing PP4 which is a timing immediately before a timing P4, and becomes zero at the timing P4. That is, the accelerator pedal operation initiated at the timing P1 is finished at the timing P4. It should be noted that the timing P1 and the timing PP1 correspond to one example of a "first timing" and a "first specific timing", respectively. The timing P2 and the timing PP2 correspond to one example of a "second timing" and a "second specific timing", respectively. The timing P3 and the timing PP3 correspond to one example of a "third timing" and a "third specific timing", respectively. The timing P4 and the timing PP4 correspond to one example of a "fourth timing" and a "fourth specific timing", respectively.

(Setting of Flags)

When the accelerator pedal operation is initiated at the timing P1 during the execution of the AC control, the first embodiment apparatus sets values of four types of flags over a period after the timing P1 every time a predetermined calculation interval elapses based on the "accelerator pedal operation amount" and a "change amount of the accelerator pedal operation amount from the previous period to the current period (hereinafter, also simply referred to as a "change amount of the accelerator pedal operation amount"). A specific description will be made below.

During a period where the change amount of the accelerator pedal operation amount is a positive value (that is, a period where the accelerator pedal operation amount itself is necessarily a positive value), the first embodiment apparatus sets or maintains a value of an AP increase flag as 1 and sets or maintains values of an AP zero flag, an AP constant flag, and an AP decrease flag as 0, respectively. In the present case, the first embodiment apparatus sets a value of the AP increase flag as 1 and sets values of the rest three types of flags as 0, respectively at the timing P1. The first embodiment apparatus maintains the values of these flags during a period from a timing immediately after the timing P1 to the timing PP2.

During a period where the accelerator pedal operation amount is a positive value and the change amount of the accelerator pedal operation amount is zero, the first embodiment apparatus sets or maintains a value of the AP constant flag as 1 and sets or maintains values of the AP zero flag, the AP increase flag, and the AP decrease flag as 0, respectively. In the present case, the first embodiment apparatus sets a value of the AP constant flag as 1 and sets values of the rest three types of flags as 0, respectively at the timing P2. The first embodiment apparatus maintains the values of these flags during a period from a timing immediately after the timing P2 to the timing PP3. It should be noted that "the change amount of the accelerator pedal operation amount is zero" strictly means that the change amount of the accelerator pedal operation amount is less than or equal to a predetermined threshold.

During a period where the change amount of the accelerator pedal operation amount is a negative value, the first embodiment apparatus sets or maintains a value of the AP decrease flag as 1 and sets or maintains values of the AP zero flag, the AP increase flag, and the AP constant flag as 0, respectively. In the present case, the first embodiment apparatus sets a value of the AP decrease flag as 1 and sets values of the rest three types of flags as 0, respectively at the timing P3. The first embodiment apparatus maintains the values of these flags during a period from a timing immediately after the timing P3 to the timing PP4.

During a period where the accelerator pedal operation amount is a zero value and the change amount of the accelerator pedal operation amount is zero, the first embodiment apparatus sets or maintains a value of the AP zero flag as 1 and sets or maintains values of the AP increase flag, the AP constant flag, and the AP decrease flag as 0, respectively. In the present case, the first embodiment apparatus sets a value of the AP zero flag as 1 and sets values of the rest three types of flags as 0, respectively at the timing P4. The first embodiment apparatus maintains the values of these flags during a period from a timing immediately after the timing P4 to a timing at which the accelerator pedal operation amount with a positive value is detected again.

(Braking Force Control)

During the execution of the AC control, the first embodiment apparatus executes the known AC control until the accelerator pedal operation amount with a positive value is first detected (that is, until the timing P1 arrives). After the timing P1, the first embodiment apparatus executes, based on the values of the flags set as described above, the braking force control (that is, sets a differential value (a slope of a tangent line) of the controlled braking force) every time the predetermined calculation interval elapses. In the present specification, a "differential value of the controlled braking force in a certain period" is defined as a left-sided differential coefficient of the controlled braking force in this period. A specific description will be made below.

The first embodiment apparatus executes the braking force control in such a manner that a differential value of the controlled braking force at a timing where values of the flags change from the AP increase flag=1 to the AP constant flag=1 becomes a value more than or equal to a sum of a differential value of the controlled braking force at a timing (period) immediately before the above timing and a differential value of the operation driving force at a timing immediately before the above timing. In addition, the first embodiment apparatus executes the braking force control in such a manner that a differential value of the controlled braking force at a timing where values of the flags change from the AP decrease flag=1 to the AP zero flag=1 or the AP constant flag=1 becomes a value less than or equal to a sum of a differential value of the controlled braking force at a timing immediately before the above timing and a differential value of the operation driving force at a timing immediately before the above timing. Further, at any timings other than these timings, the first embodiment apparatus executes the braking force control in such a manner that a differential value of the controlled braking force matches with a differential value of the controlled braking force at an immediately previous timing.

In the present case, values of the flags change from the AP increase flag=1 to the AP constant flag=1 at the timing P2 and change from the AP decrease flag=1 to the AP zero flag=1 at the timing P4. Therefore, the first embodiment apparatus executes the braking force control in such a manner that a differential value of the controlled braking force at the timing P2 becomes a value larger than a sum of a differential value of the controlled braking force at the timing PP2 and a differential value of the operation driving force at the timing PP2. In addition, the first embodiment apparatus executes the braking force control in such a manner that a differential value of the controlled braking force at the timing P4 becomes a value smaller than a sum of a differential value of the controlled braking force at the timing PP4 and a differential value of the operation driving force at the timing PP4. Further, at timings other than the timing P2 and the timing P4, the first embodiment apparatus executes the braking force control in such a manner that a differential value of the controlled braking force matches with a differential value of the controlled braking force at an immediately previous timing.

As a result, a differential value of the controlled braking force becomes a constant value mB1A during a period from the timing P1 to the timing PP2 (hereinafter, also referred to as a "period P1PP2"), becomes a constant value mB2A larger than the above value mB1A (mB2A>mB1A) during a period from the timing P2 to the timing PP4 (hereinafter, also referred to as a "period P2PP4"), and becomes a constant value mB3A smaller than the above value mB2A (mB3A<mB2A) during a period from the timing P4 to a terminal point E1 (hereinafter, also referred to as a "period P4E1"), the terminal point E1 being a timing corresponding to a right-sided end point of the controlled braking force in the present case. It should be noted that the timing PP4 and the period P2PP4 correspond to one example of a "first terminal timing" and a "first period", respectively. In addition, the terminal point E1 and the period P4E1 correspond to one example of a "second terminal timing" and a "second period", respectively.

(Driving Force Control)

The first embodiment apparatus executes the driving force control during the execution of the AC control every time the predetermined calculation interval elapses (that is, sets a differential value (a slope of a tangent line) of the controlled driving force). It should be noted that in the present specification, a "differential value of the controlled driving force in a certain period" is defined as a left-sided differential coefficient of the controlled driving force in this period. During a period (the period P2PP4 in the present case), a differential value of the controlled braking force during this period being larger than a differential value thereof at a timing immediately before this period, the first embodiment apparatus executes the driving force control in such a manner that a differential value of the controlled driving force matches with a differential value of the controlled driving force at an immediately previous timing of this period. In addition, during a period (the period P4E1 in the present case), a differential value of the controlled braking force during this period being smaller than a differential value thereof at a timing immediately before this period, the first embodiment apparatus executes the driving force control in such a manner that a differential value of the controlled driving force matches with a differential value of the controlled driving force at an immediately previous timing of this period. In the present case, the first embodiment apparatus executes the driving force control in such a manner that a differential value of the controlled driving force remains constant during a period from a timing of t=0 to the terminal point E1.

The execution of the braking force control and the driving force control by the first embodiment apparatus maintains or increases a differential value of the first longitudinal force (i.e., jerk of the vehicle) at the timing P2 and maintains or decreases a differential value of the first longitudinal force at the timing P4. That is, the maintenance or the increase in the acceleration feeling or the maintenance or the moderation in the deceleration feeling is realized at the timing P2, and maintenance or moderation in the acceleration feeling or maintenance or increase in the deceleration feeling is realized at the timing P4.

Effects unique to the present case will be described. The driver initiates the accelerator pedal operation at the timing P1, expecting the acceleration feeling to be increased and during a period (hereinafter, also referred to as a "period P1PP3") from the timing P1 to the timing PP3 which is a terminal timing of a period where the accelerator pedal operation amount is maintained constant, the driver expects the acceleration feeling to be maintained or increased. However, in a conventional configuration, a differential value of the controlled braking force (refer to a dashed line in FIG. 3) was constant even though the change amount of the accelerator pedal operation amount changed from positive to zero at the timing P2. Therefore, a differential value of the first longitudinal force (refer to a thick dashed line in FIG. 3) decreases at the timing P2 (because a differential value of the operation driving force decreases at the timing P2) and this decreased differential value had been maintained until the timing PP3 arrived. That is, the acceleration feeling was moderated at the timing P2 and this moderated acceleration feeling had been maintained until the timing PP3 arrived. This caused a problem that the driver feels that the acceleration feeling at a timing at which the vehicle starts moving forward (a timing corresponding to an intersection at which a "conventional first longitudinal force" intersects with a horizontal axis as well as a timing between the timing P2 and the timing PP3) is smaller than the acceleration feeling which the driver had expected to have (that is, a behavior of the first longitudinal force contradicts with the accelerator pedal operation), resulting in having a sense of discomfort.

In contrast, in the present case, a differential value of the first longitudinal force (refer to a thick line in FIG. 3) increases at the timing P2 and this increased differential value has been maintained until the timing PP3 arrives. Therefore, the acceleration feeling increases at the timing P2 and this increased acceleration feeling has been maintained until the timing PP3 arrives. Therefore, the driver feels that the acceleration feeling has increased at a timing at which the vehicle starts moving forward (a timing corresponding to an intersection at which the first longitudinal force intersects with the horizontal axis as well as a timing between the timing P2 and the timing PP3), which enables the driver to feel that the vehicle behaves as the driver intended. As a result, a possibility that a behavior of the first longitudinal force contradicts with the accelerator pedal operation can be reduced, different from the conventional configuration.

In addition, in the present case, the accelerator pedal operation is terminated at the timing P4, and thus the driver expects the acceleration feeling to be maintained or moderated at the timing P4. However, in the conventional configuration, a differential value of the controlled braking force (refer to the dashed line in FIG. 3) was constant even though the change amount of the accelerator pedal operation amount changes from negative to zero at the timing P4. Therefore, a differential value of the first longitudinal force (refer to the thick dashed line in FIG. 3) increased at the timing P4 (because a differential value of the operation driving force increases at the timing P4). That is, the acceleration feeling increased at the timing P4. Therefore, there was a problem that the driver felt that a behavior of the first longitudinal force contradicted with the accelerator pedal operation, resulting in having a sense of discomfort.

In contrast, in the present case, a differential value of the first longitudinal force decreases at the timing P4. That is, the acceleration feeling is moderated at the timing P4. This enables the driver to feel that the vehicle behaves as the driver intended. Hence, a possibility that a behavior of the first longitudinal force contradicts with the accelerator pedal operation can be reduced, different from the conventional configuration.

Effects common to every case will be described later. The same thing can be said to cases B, C, D which will be mentioned later.

Figure 4:
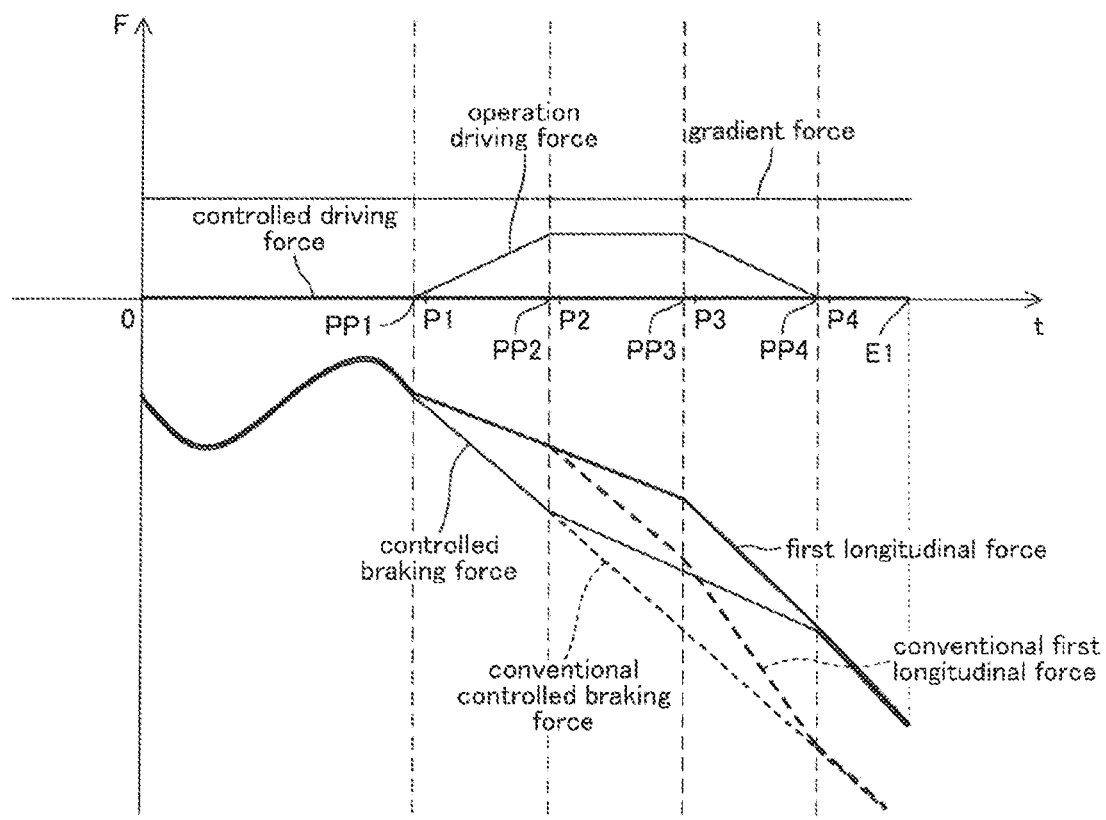
FIG. 4 is a time chart showing a time transition of each force acting on the vehicle in a case when the accelerator pedal operation has been performed during the execution of the AC control (case B).

Case B: Case where the Vehicle is Traveling on a Descending Road by the AC Control FIG. 4 is a time chart showing a time transition of each force acting on the vehicle in a case B. The present case assumes a case where the driver operates the accelerator pedal for a purpose of moderating the deceleration feeling under a situation where the vehicle is traveling on a descending road during the execution of the AC control. On the vehicle, a gradient force with a positive value is acting. Thus, in the present case, the controlled driving force is maintained as a zero value, and an acceleration control and a deceleration control of the vehicle are executed only with the controlled braking force. Specific description will be made below. It should be noted that in the case A, a description about the operation detail of the first embodiment apparatus common to all cases was made in addition to the operation detail of the first embodiment apparatus unique to the case A. Therefore, in the present case, a description only about operation detail of the first embodiment apparatus unique to the present case will be made. Besides, a description on a similar configuration to the case A will be omitted. The same thing can be said to the case C and the case D which will be mentioned later.

(Braking Force Control)

During the execution of the AC control, the first embodiment apparatus executes the known AC control until the accelerator pedal operation amount with a positive value is first detected (that is, until the timing P1 arrives). After the timing P1, the first embodiment apparatus executes, based on the values of the flags set as described above, the braking force control every time the predetermined calculation interval elapses.

In the present case, the first embodiment apparatus executes the braking force control in such a manner that a differential value of the controlled braking force at the timing P2 matches with a sum of a differential value of the controlled braking force at the timing PP2 and a differential value of the operation driving force at the timing PP2. Other than this control, the first embodiment apparatus executes the braking force control similar to the control in the case A. As a result, a differential value of the controlled braking force becomes a constant value mB1B during the period P1PP2, becomes a constant value mB2B larger than the above value mB1B (mB2B>mB1B) during the period P2PP4, and becomes a constant value mB3B smaller than the above value mB2B (mB3B<mB2B) during the period P4E1.

(Driving Force Control)

In the present case, the first embodiment apparatus executes the driving force control to maintain the controlled driving force as a zero value.

Effects unique to the present case will be described. The driver initiates the accelerator pedal operation at the timing P1, expecting the deceleration feeling to be moderated and during a period from the timing P1 to the timing PP3 which is a terminal timing of a period where the accelerator pedal operation amount is maintained constant, the driver expects the deceleration feeling to be maintained or moderated. However, in a conventional configuration, a differential value of the controlled braking force (refer to a dashed line in FIG. 4) was constant during a period (hereinafter, also referred to as a "period PP2P2") from the timing PP2 to the timing P2. Therefore, a differential value of the first longitudinal force (refer to a thick dashed line in FIG. 4) decreased at the timing P2. That is, the deceleration feeling increased at the timing P2, which caused a problem that the driver felt that a behavior of the first longitudinal force contradicted with the accelerator pedal operation, resulting in having a sense of discomfort.

In contrast, in the present case, a differential value of the first longitudinal force (refer to a thick line in FIG. 4) is maintained constant at the timing P2. That is, the deceleration feeling remains unchanged at the timing P2, which enables the driver to feel that the vehicle behaves as the driver intended at the timing P2, As a result, a possibility that a behavior of the first longitudinal force contradicts with the accelerator pedal operation can be reduced, different from the conventional configuration.

In addition, in the present case, the accelerator pedal operation is terminated at the timing P4, and thus the driver expects the deceleration feeling to be maintained or increased at the timing P4. However, in the conventional configuration, a differential value of the controlled braking force (refer to the dashed line in FIG. 4) was constant during a period (hereinafter, also referred to as a "period PP4P4") from the timing PP4 to the timing P4. Therefore, a differential value of the first longitudinal force (refer to the thick dashed line in FIG. 4) increased at the timing P4, That is, the deceleration feeling was moderated at the timing P4, which caused a problem that the driver felt that a behavior of the first longitudinal force contradicted with the accelerator pedal operation, resulting in having a sense of discomfort.

In contrast, in the present case, a differential value of the first longitudinal force decreases at the timing P4. That is, the deceleration feeling increases at the timing P4, which enables the driver to feel that the vehicle behaves as the driver intended at the timing P4. As a result, a possibility that a behavior of the first longitudinal force contradicts with the accelerator pedal operation can be reduced, different from the conventional configuration.

Figure 5:
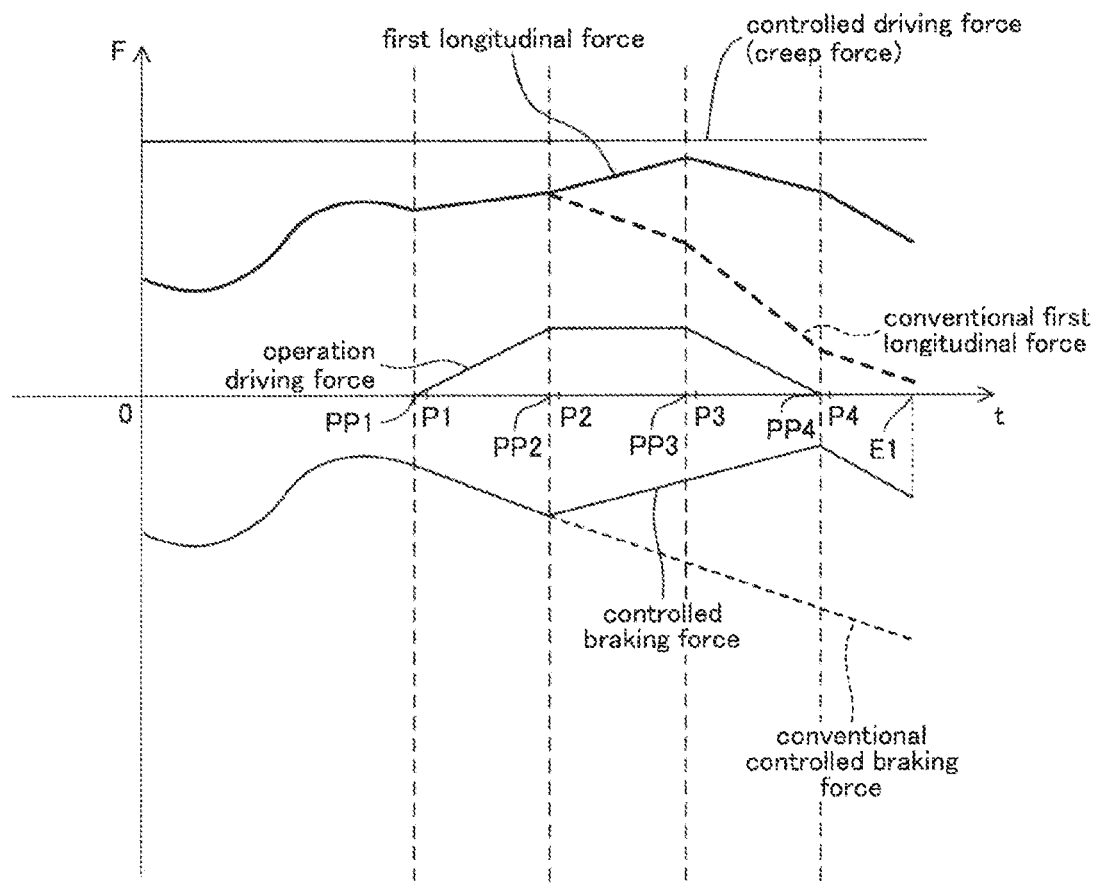
FIG. 5 is a time chart showing a time transition of each force acting on the vehicle in a case when the accelerator pedal operation has been performed during execution of parking assist control (case C).

Case C: Case where the Vehicle is Traveling at a Slow Speed by the Parking Assist Control FIG. 5 is a time chart showing a time transition of each force acting on the vehicle in a case C. The present case assumes a case where the driver operates the accelerator pedal for a purpose of increasing the acceleration feeling under a situation where the vehicle is traveling on a horizontal road at a slow speed by the parking assist control. In the present case, the controlled driving force is maintained at a value of creep force, and the acceleration control and the deceleration control of the vehicle are executed only by the controlled braking force. A specific description will be made below.

(Braking Force Control)

During the execution of the parking assist control, the first embodiment apparatus executes the known parking assist control until the accelerator pedal operation amount with a positive value is first detected (that is, until the timing P1 arrives). After the timing P1, the first embodiment apparatus executes, based on the values of the flags set as described above, the braking force control every time the predetermined calculation interval elapses.

In the present case, the first embodiment apparatus executes the braking force control similar to the control in the case A. As a result, a differential value of the controlled braking force becomes a constant value mB1C during the period P1PP2, becomes a constant value mB2C larger than the above value mB1C (mB2C>mB1C) during the period P2PP4, and becomes a constant value mB3C smaller than the above value mB2C (mB3C<mB2C) during the period P4E1.

(Driving Force Control)

In the present case, the first embodiment apparatus executes the driving force control to maintain the controlled driving force as the creep force.

Effects unique to the present case will be described. The driver initiates the accelerator pedal operation at the timing P1, expecting the acceleration feeling to be increased and during a period from the timing P1 to the timing PP3 which is a terminal timing of a period where the accelerator pedal operation amount is maintained constant, the driver expects the acceleration feeling to be maintained or increased. However, in a conventional configuration, a differential value of the controlled braking force (refer to a dashed line in FIG. 5) was constant during the period PP2P2. Therefore, a differential value of the first longitudinal force (refer to a thick dashed line in FIG. 5) decreased at the timing P2. That is, the acceleration feeling was moderated at the timing P2, which caused a problem that the driver felt that a behavior of the first longitudinal force contradicted with the accelerator pedal operation, resulting in having a sense of discomfort.

In contrast, in the present case, a differential value of the first longitudinal force (refer to a thick line in FIG. 5) increases at the timing P2. Therefore, the acceleration feeling increases at the timing P2, which enables the driver to feel that the vehicle behaves as the driver intended at the timing P2. As a result, a possibility that a behavior of the first longitudinal force contradicts with the accelerator pedal operation can be reduced, different from the conventional configuration.

In addition, in the present case, the accelerator pedal operation is terminated at the timing P4, and thus the driver expects the acceleration feeling to be maintained or moderated at the timing P4. However, in the conventional configuration, a differential value of the controlled braking force (refer to the dashed line in FIG. 5) was constant during the period PP4P4. Therefore, a differential value of the first longitudinal force (refer to the thick dashed line in FIG. 5) increased at the timing P4. That is, the acceleration feeling was increased at the timing P4, which caused a problem that the driver felt that a behavior of the first longitudinal force contradicted with the accelerator pedal operation, resulting in having a sense of discomfort.

In contrast, in the present case, a differential value of the first longitudinal force decreases at the timing P4. That is, the acceleration feeling is moderated at the timing P4, which enables the driver to feel that the vehicle behaves as the driver intended at the timing P4, As a result, a possibility that a behavior of the first longitudinal force contradicts with the accelerator pedal operation can be reduced, different from the conventional configuration.

Figure 6:
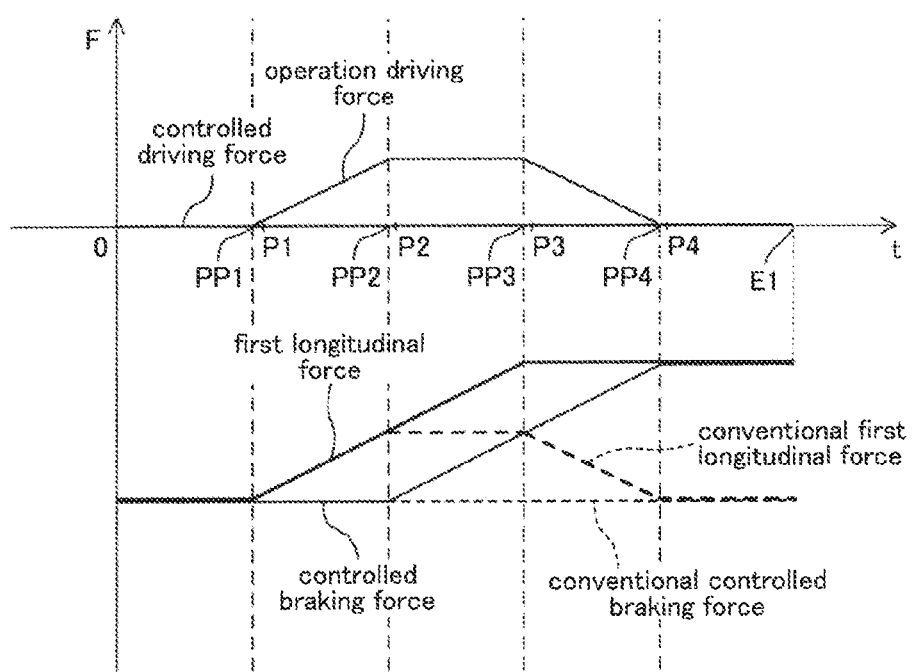
FIG. 6 is a time chart showing a time transition of each force acting on the vehicle in a case when the accelerator pedal operation has been performed during the execution of the AC control (case D).

Case D: Case where the Vehicle is Decelerating at a Constant Acceleration by the AC Control FIG. 6 is a time chart showing a time transition of each force acting on the vehicle in a case D. The present case assumes a case where the driver operates the accelerator pedal for a purpose of moderating the deceleration feeling under a situation where the vehicle is decelerating at a constant acceleration by the AC control. Therefore, the controlled driving force is maintained at a zero value in the present case. A specific description will be made below.

(Braking Force Control)

During the execution of the AC control, the first embodiment apparatus executes the known AC control (that is, a control to maintain the controlled braking force at a negative constant value) until the accelerator pedal operation amount with a positive value is first detected (that is, until the timing P1 arrives). After the timing P1, the first embodiment apparatus executes, based on the values of the flags set as described above, the braking force control every time the predetermined calculation interval elapses.

In the present case, the first embodiment apparatus executes the braking force control in such a manner that a differential value of the controlled braking force at the timing P2 matches with a sum of a differential value of the controlled braking force at the timing PP2 and a differential value of the operation driving force at the timing PP2. In addition, the first embodiment apparatus executes the braking force control in such a manner that a differential value of the controlled braking force at the timing P4 matches with a sum of a differential value of the controlled braking force at the timing PP4 and a differential value of the operation driving force at the timing PP4. Other than these controls, the first embodiment apparatus executes the braking force control similar to the control in the case A. As a result, a differential value of the controlled braking force becomes a zero value mB1D during the period P1PP2, becomes a constant value mB2D larger than the above value mB1D (mB2D>mB1D) during the period P2PP4, and becomes a constant value mB3D (a zero value in the present case) smaller than the above value mB2D (mB3D<mB2D) during the period P4E1.

(Driving Force Control)

In the present case, the first embodiment apparatus executes the driving force control to maintain the controlled driving force as a zero value.

Effects unique to the present case will be described. The driver initiates the accelerator pedal operation at the timing P1, expecting the deceleration feeling to be moderated and during a period from the timing P1 to the timing PP3 which is a terminal timing of a period where the accelerator pedal operation amount is maintained constant, the driver expects the deceleration feeling to be maintained or moderated. However, in a conventional configuration, a differential value of the controlled braking force (refer to a dashed line in FIG. 6) was constant (the zero value) during the period PP2P2. Therefore, a differential value of the first longitudinal force (refer to a thick dashed line in FIG. 6) decreased at the timing P2. That is, the deceleration feeling increased at the timing P2, which caused a problem that the driver felt that a behavior of the first longitudinal force contradicted with the accelerator pedal operation, resulting in having a sense of discomfort.

In contrast, in the present case, a differential value of the first longitudinal force (refer to a thick line in FIG. 6) is maintained constant at the timing P2. That is, the deceleration feeling remains unchanged at the timing P2, which enables the driver to feel that the vehicle behaves as the driver intended at the timing P2. As a result, a possibility that a behavior of the first longitudinal force contradicts with the accelerator pedal operation can be reduced, different from the conventional configuration.

In addition, in the present case, the accelerator pedal operation is terminated at the timing P4, and thus the driver expects the deceleration feeling to be maintained or increased at the timing P4. However, in the conventional configuration, a differential value of the controlled braking force (refer to the dashed line in FIG. 6) was constant during the period PP4P4. Therefore, a differential value of the first longitudinal force (refer to the thick dashed line in FIG. 6) increased at the timing P4. That is, the deceleration feeling was moderated at the timing P4, which caused a problem that the driver felt that a behavior of the first longitudinal force contradicted with the accelerator pedal operation, resulting in having a sense of discomfort.

In contrast, in the present case, a differential value of the first longitudinal force is maintained constant at the timing P4. That is, the deceleration feeling remains unchanged at the timing P4, which enables the driver to feel that the vehicle behaves as the driver intended at the timing P4. As a result, a possibility that a behavior of the first longitudinal force contradicts with the accelerator pedal operation can be reduced, different from the conventional configuration.

<Specific Operation of the First Embodiment Apparatus>

Next, specific operation of the first embodiment apparatus will be described. The CPU of the ECU 10 is configured to execute a routine shown by flowcharts in FIG. 7 to FIG. 10 every time the predetermined calculation interval elapses during a period where an ignition switch is being turned on (hereinafter, also referred to as an "engine on period").

Figure 7:
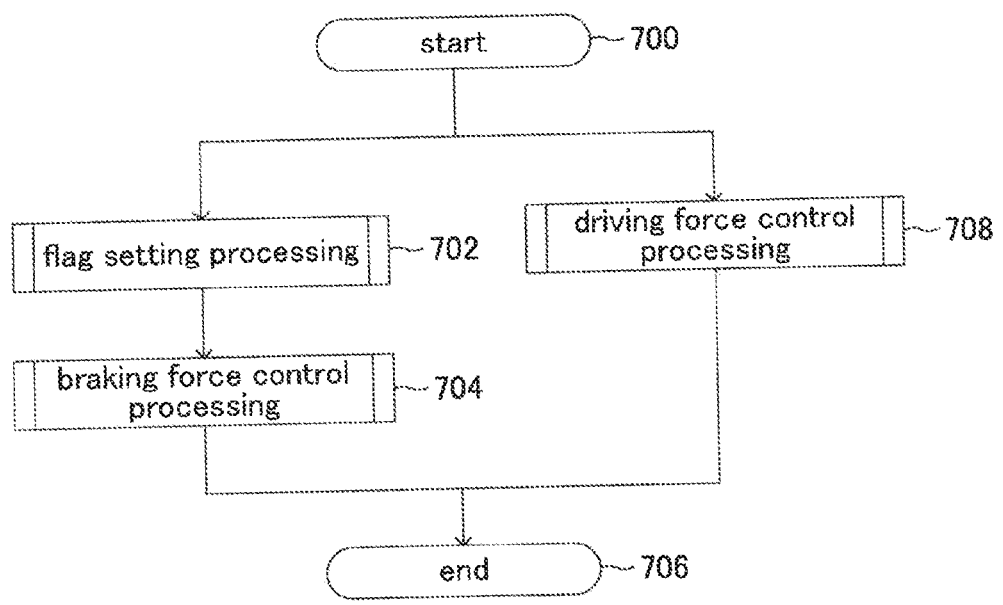
FIG. 7 is a flowchart showing a routine executed by CPU of vehicle control ECU of the first embodiment apparatus (This CPU will be hereinafter referred to as "CPU of the first embodiment apparatus").

When a predetermined timing arrives, the CPU initiates processing from a step 700 in FIG. 7 and simultaneously executes processing of a step 702 and a step 704 and processing of a step 708. The former processing will be described first, followed by a description of the latter processing.

Step 702: The CPU executes flag setting processing. In the routine in FIG. 7, the CPU executes at the step 702 the routines shown by the flowcharts in FIG. 8A and FIG. 8B. That is, when the CPU proceeds to the step 702, the CPU initiates processing from a step 800 in FIG. 8A and executes processing of a following step 802.

Step 802: The CPU determines whether or not the vehicle control (the AC control or the parking assist control) is being executed: When having determined that the vehicle control is not being executed (S802: No), the CPU proceeds to a step 810 to tentatively terminate the present routine. That is, the CPU does not execute the flag setting processing when the vehicle control is not being executed. On the other hand, when having determined that the vehicle control is being executed (S802: Yes), the CPU executes processing of a following step 804.

Step 804: The CPU determines whether or not the accelerator pedal operation amount is positive. When having determined that the accelerator pedal operation amount is positive (S804: Yes), the CPU determines that the accelerator pedal operation is being performed by the driver and executes processing of a following step 806.

Step 806: The CPU determines whether or not the accelerator pedal operation amount at the immediately previous period was positive. When having determined that the accelerator pedal operation amount at the immediately previous period was zero (S806: No), the CPU executes processing of a following step 808.

Step 808: The CPU determines that the accelerator pedal operation has been initiated at the current period or that the change amount of the accelerator pedal operation amount has changed from negative to positive at the current period, and thus the CPU sets a value of the AP increase flag as 1 and sets values of the AP constant flag, the AP decrease flag, and the AP zero flag as 0, respectively. Thereafter, the CPU proceeds to the step 810 to tentatively terminate the present routine.

On the other hand, when having determined at the step 806 that the accelerator pedal operation amount at the immediately previous period was positive (S806: Yes), the CPU executes processing of a step 812 in FIG. 8B.

Step 812: The CPU determines whether or not the accelerator pedal operation amount at the current period has been constant from the immediately previous period (that is, whether or not the change amount of the accelerator pedal operation amount is zero). When having determined that the accelerator pedal operation amount at the current period has not been constant (that is, the change amount of the accelerator pedal operation amount is positive or negative) (S812: No), the CPU executes processing of a following step 814.

Step 814: The CPU determines whether or not the accelerator pedal operation amount at the current period has increased from the amount at the immediately previous period (that is, whether or not the change amount of the accelerator pedal operation amount is positive). When having determined that the accelerator pedal operation amount at the current period has increased (that is, the change amount of the accelerator pedal operation amount is positive) (S814: Yes), the CPU executes processing of a following step 816.

Step 816: The CPU determines whether or not the AP increase flag at the immediately previous period was 1. When having determined that the AP increase flag was 1 (S816: Yes), the CPU proceeds to the step 810 to tentatively terminate the present routine. That is, the CPU maintains the values of the four types of flags.

On the other hand, when having determined at the step 812 that the accelerator pedal operation amount at the current period has been constant from the immediately previous period (that is, the change amount of the accelerator pedal operation amount is zero) (S812: Yes), the CPU executes processing of a following step 818.

Step 818: The CPU determines whether or not the AP constant flag at the immediately previous period was 1. When having determined that the AP constant flag at the immediately previous period was not 1 (S818: No), the CPU executes processing of a following step 820.

Step 820: The CPU determines that the change amount of the accelerator pedal operation amount has changed from positive or negative to zero at the current period, and thus sets a value of the AP constant flag as 1 and sets values of the AP decrease flag, the AP zero flag, and the AP increase flag as 0, respectively. Thereafter, the CPU proceeds to the step 810 to tentatively terminate the present routine.

On the other hand, when having determined at the step 818 that the AP constant flag at the immediately previous period was 1 (S818: Yes), the CPU proceeds to the step 810 to tentatively terminate the present routine. That is, the CPU maintains the values of the four types of flags.

In contrast, when having determined at the step 814 that the accelerator pedal operation amount at the current period has decreased from the amount at the immediately previous period (that is, the change amount of the accelerator pedal operation amount is negative) (S814: No), the CPU executes processing of a following step 822.

Step 822: The CPU determines whether or not the AP decrease flag at the immediately previous period was 1. When having determined that the AP decrease flag at the immediately previous period was not 1 (S822: No), the CPU executes processing of a following step 824.

Step 824: The CPU determines that the change amount of the accelerator pedal operation amount has changed from zero or positive to negative at the current period, and thus sets a value of the AP decrease flag as 1 and sets values of the AP zero flag, the AP increase flag, and the AP constant flag as 0, respectively. Thereafter, the CPU proceeds to the step 810 to tentatively terminate the present routine.

On the other hand, when having determined at the step 822 that the AP decrease flag at the immediately previous period was 1 (3822: Yes), the CPU proceeds to the step 810 to tentatively terminate the present routine. That is, the CPU maintains the values of the four types of flags.

On the other hand, when having determined at the step 816 that the AP increase flag at the immediately previous period was 0 (S816: No), the CPU executes processing of a following step 836.

Step 836: The CPU determines that the change amount of the accelerator pedal operation amount has changed from zero or negative to positive at the current period, and thus sets a value of the AP increase flag as 1 and sets values of the AP constant flag, the AP decrease flag, and the AP zero flag as 0, respectively. Thereafter, the CPU proceeds to the step 810 to tentatively terminate the present routine.

Figure 8A:
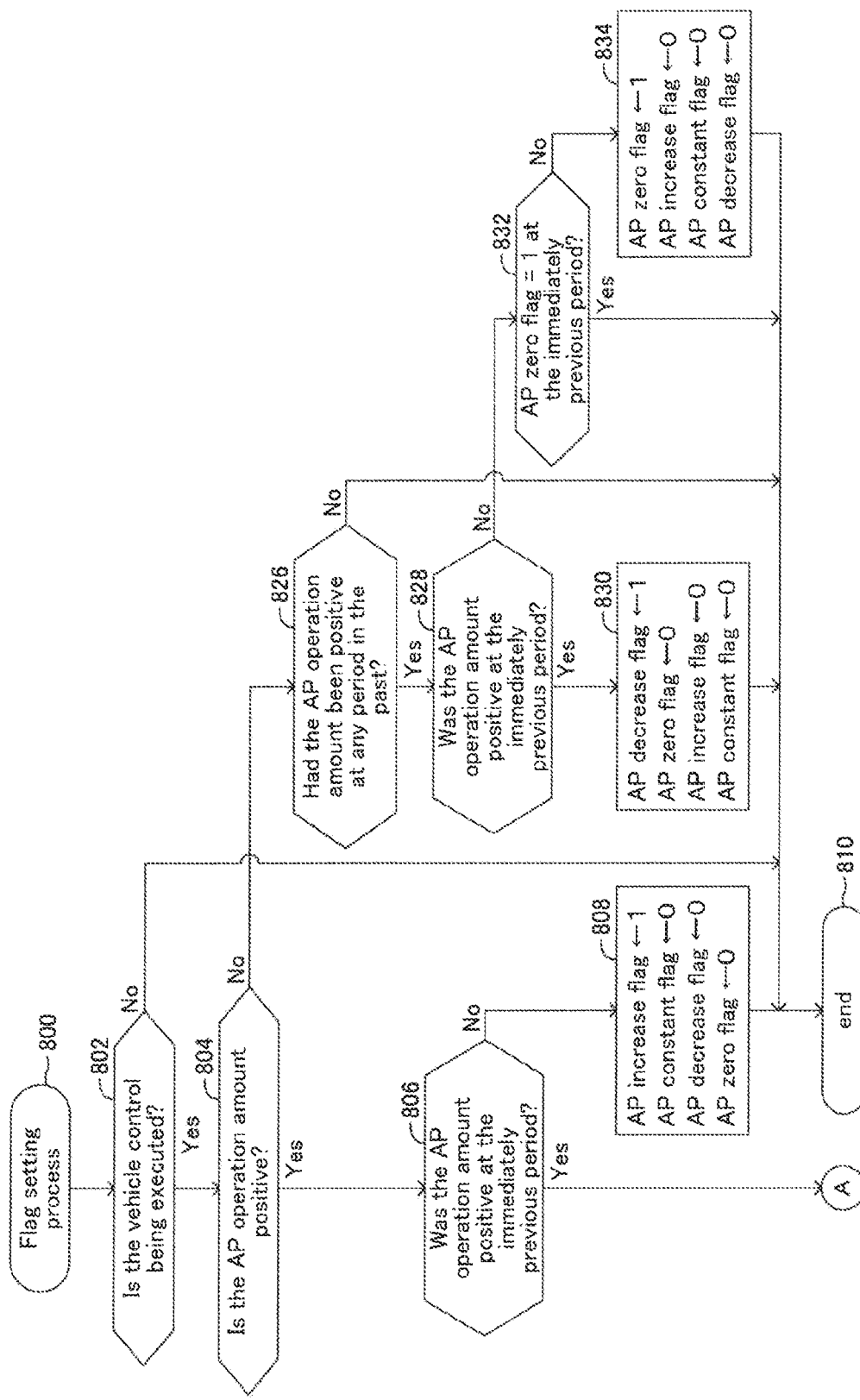
FIG. 8A is a first half of a flowchart showing flag setting process among routines executed by the CPU of the first embodiment apparatus.
Figure 8B:
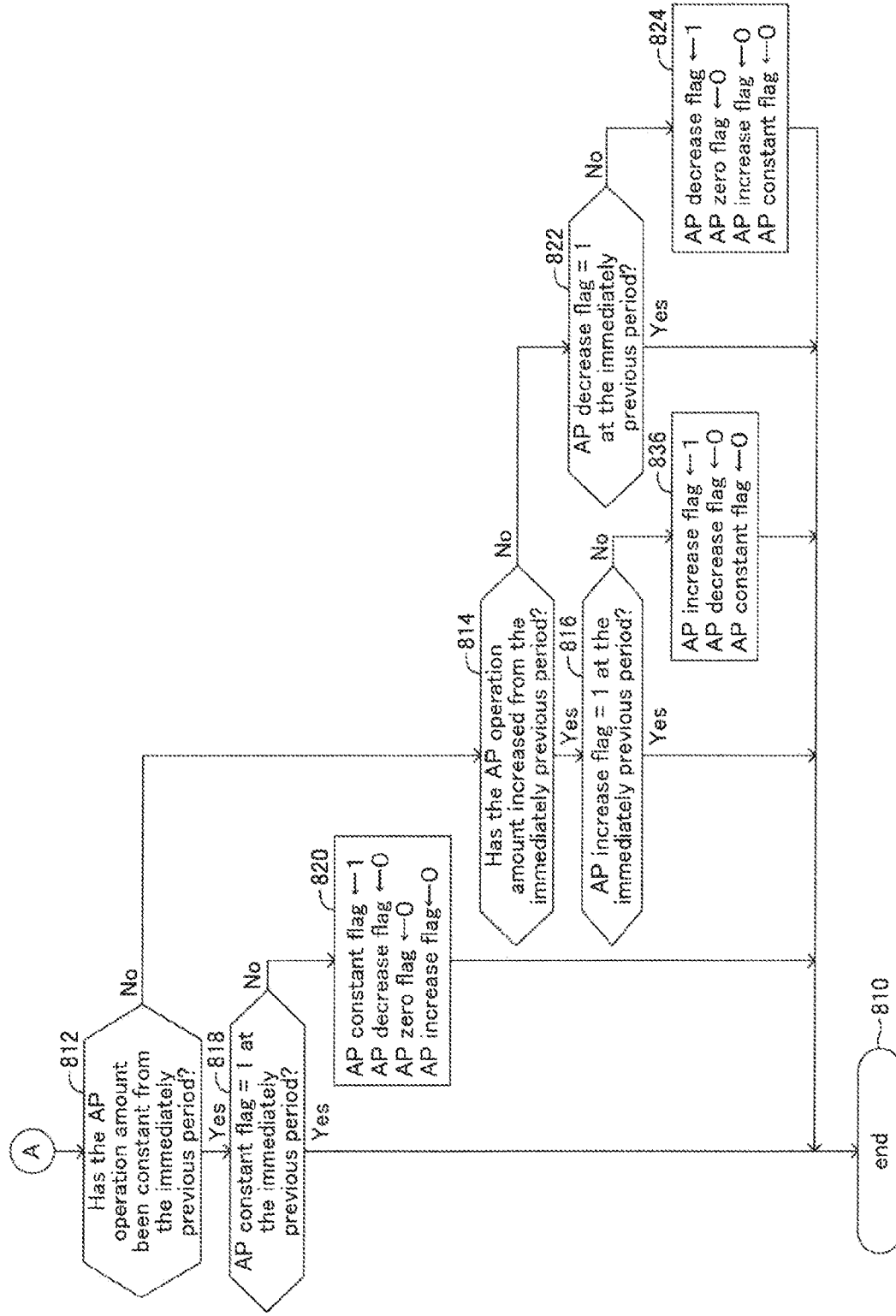
FIG. 8B is a second half of the flowchart showing the flag setting process among the routines executed by the CPU of the first embodiment apparatus.
Figure 9:
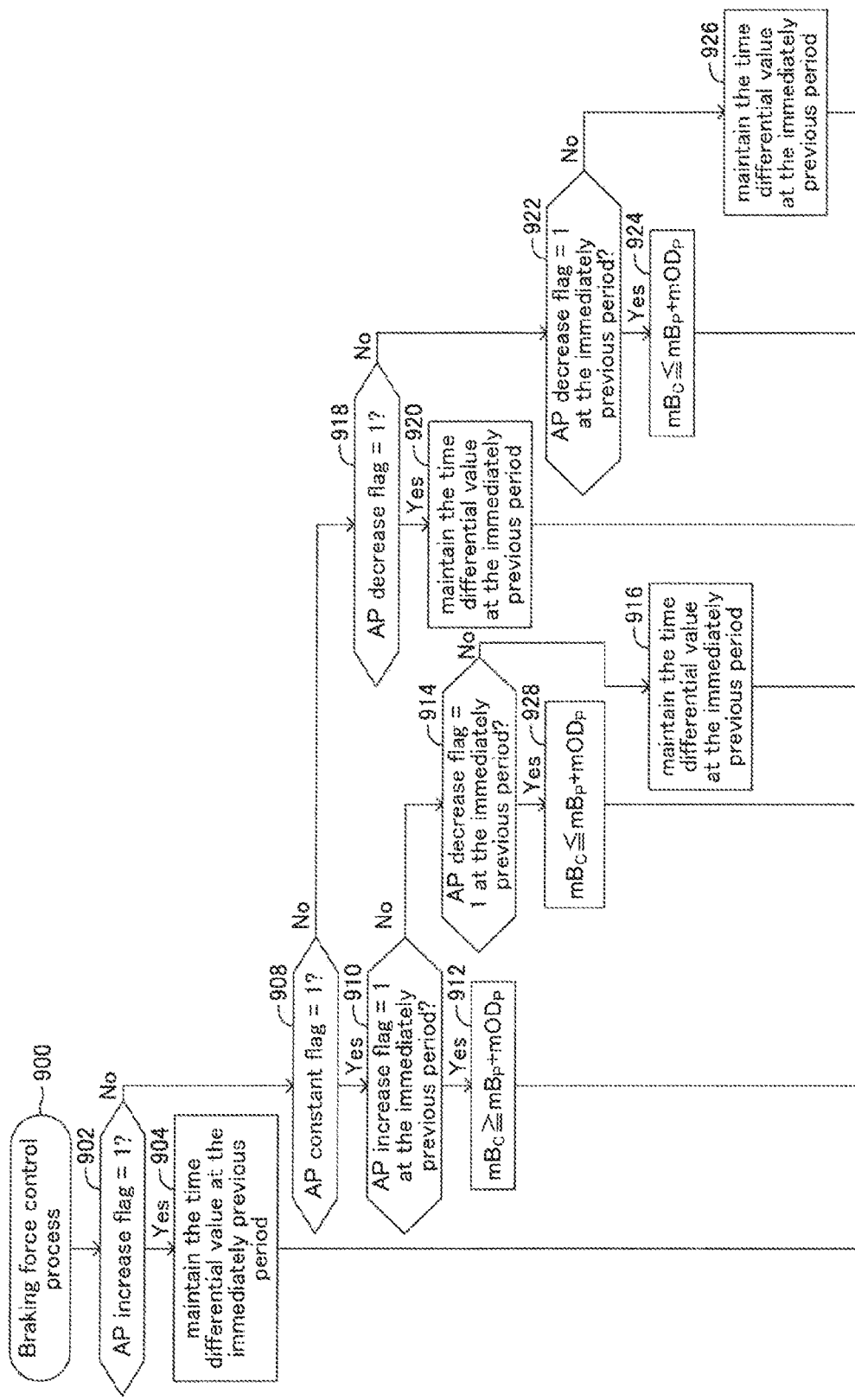
FIG. 9 is a flowchart showing braking force control process among the routines executed by the CPU of the first embodiment apparatus.
Figure 10:
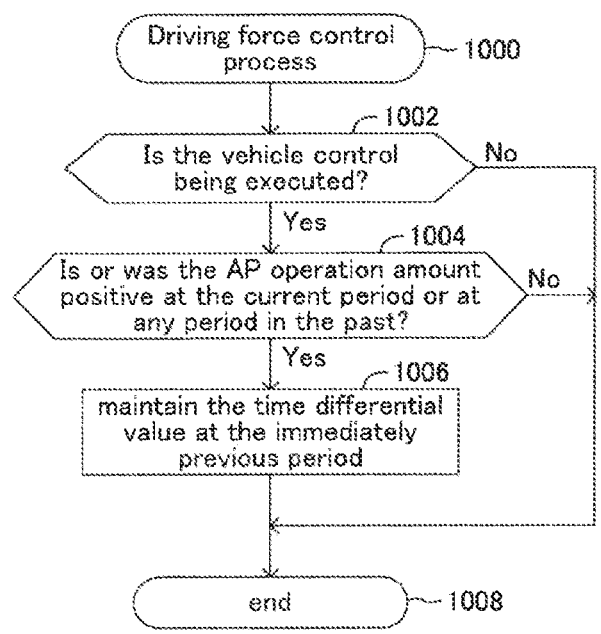
FIG. 10 is a flowchart showing driving force control process among the routines executed by the CPU of the first embodiment apparatus.

In contrast, when having determined at the step 804 in FIG. 8A that the accelerator pedal operation amount is zero (S804: No), the CPU determines that the accelerator pedal operation is not being performed by the driver and executes processing of a following step 826.

Step 826: The CPU determines whether or not the accelerator pedal operation amount had been positive at any period in the past (that is, any period in the past during this engine one period). When having determined that the accelerator pedal operation amount had been positive at a certain period in the past (S826: Yes), the CPU determines that the accelerator pedal operation had been performed in the past by the driver during this engine on period and executes processing of a following step 828.

Step 828: The CPU determines whether or not the accelerator pedal operation amount at the immediately previous period was positive. When having determined that the accelerator pedal operation amount at the immediately previous period was positive (S828: Yes), the CPU executes processing of a following step 830.

Step 830: The CPU determines that the accelerator pedal operation amount decreased from the immediately previous period to have become zero at the current period, and thus the CPU sets a value of the AP decrease flag as 1 and sets values of the AP zero flag, the AP increase flag, and the AP constant flag as 0, respectively. Thereafter, the CPU proceeds to the step 810 to tentatively terminate the present routine.

On the other hand, when having determined at the step 828 that the accelerator pedal operation amount at the immediately previous period was zero (S828: No), the CPU executes processing of a following step 832.

Step 832: The CPU determines whether or not the AP zero flag at the immediately previous period was 1. When having determined that the AP zero flag at the immediately previous period was not 1 (S832: No), the CPU executes processing of a following step 834.

Step 834: The CPU determines that the accelerator pedal operation amount changed from positive to zero at the immediately previous period (that is, the AP decrease flag at the immediately previous period was 1) as well as that the accelerator pedal operation amount is maintained as zero also at the current period (that is, the change amount of the accelerator pedal operation amount is zero). Thus, the CPU sets a vague of the AP zero flag as 1 and sets values of the AP increase flag, the AP constant flag, and the AP decrease flag as 0, respectively. Thereafter, the CPU proceeds to the step 810 to tentatively terminate the present routine.

In contrast, when having determined at the step 832 that the AP zero flag at the immediately previous period was 1 (S832: Yes), the CPU proceeds to the step 810 to tentatively terminate the present routine. That is, the CPU maintains the values of the four types of flags.

On the other hand, when having determined at the step 826 that the accelerator pedal operation amount had not been positive at any period in the past during this engine on period (S826: No), the CPU determines that the accelerator pedal operation had not been performed by the driver even once during this engine on period and proceeds to the step 810 to tentatively terminate the present routine, That is, the CPU does not execute the flag setting processing until the accelerator pedal operation amount with a positive value is first detected during the engine on period.

This is the description about the flag setting processing at the step 702 (refer to FIG. 7). When having finished the flag setting processing, the CPU proceeds to the step 704 in FIG. 7 via the step 810, At the step 704, the CPU executes braking force control processing based on the values of the flags set in the step 702. In the routine in FIG. 7, the CPU executes at the step 704 a routine in FIG. 9. That is, when the CPU proceeds to the step 704, the CPU initiates processing from a step 900 in FIG. 9 and executes processing of a following step 902.

Step 902: The CPU determines whether or not a value of the AP increase flag is 1. When having determined that a value of the AP increase flag is 1 (S902: Yes), the CPU executes processing of a following step 904.

Step 904: The CPU executes the braking force control in such a manner that a differential value of the controlled braking force at the current period matches with a differential value of the controlled braking force at the immediately previous period. That is, the CPU maintains the differential value of the controlled braking force at the immediately previous period. Thereby, during a period where a value of the AP increase flag is 1 (the period P1PP2), each of the differential values mB1A to mB1D of the controlled braking forces (refer to the case A to the case D) matches with the corresponding differential value of the controlled braking force at the timing PP1. After the processing of the step 904, the CPU proceeds to a step 906 to tentatively terminate the present routine.

On the other hand, when having determined at the step 902 that a value of the AP increase flag is 0 (S902: No), the CPU executes processing of a following step 908.

Step 908: The CPU determines whether or not a value of the AP constant flag is 1. When having determined that a value of the AP constant flag is 1 (S908: Yes), the CPU executes processing of a following step 910.

Step 910: The CPU determines whether or not a value of the AP increase flag at the immediately previous period was 1. When having determined that a value of the AP increase flag at the immediately previous period was 1 (S910: Yes), the CPU executes processing of a following step 912.

Step 912: The CPU determines that values of the flags have changed from the AP increase flag=1 to the AP constant flag=1 at the current period, and executes the braking force control in such a manner that the differential value mBC of the controlled braking force at the current period becomes a value more than or equal to a sum of a differential value mBp of the controlled braking force at the immediately previous period and a differential value mODp of the operation driving force at the immediately previous period (i.e., mBC≥mBp+mODp). The CPU thereafter proceeds to the step 906 to tentatively terminate the present routine.

On the other hand, when having determined at the step 910 that a value of the AP increase flag at the immediately previous period was 0 (S910: No), the CPU executes processing of a following step 914.

Step 914: The CPU determines whether or not a value of the AP decrease flag at the immediately previous period was 1. When having determined that a value of the AP decrease flag at the immediately previous period was 0 (S914: No), the CPU executes processing of a following step 916.

Step 916: The CPU determines that a value of the AP constant flag at the immediately previous period was 1 (that is, the accelerator pedal operation amount have been constant over immediately previous two periods) and executes the braking force control in such a manner that a differential value of the controlled braking force at the current period matches with a differential value of the controlled braking force at the immediately previous period. That is, the CPU maintains the differential value of the controlled braking force at the immediately previous period. The CPU thereafter proceeds to the step 906 to tentatively terminate the present routine.

In contrast, when having determined at the step 908 that a value of the AP constant flag is 0 (S908: No), the CPU executes processing of a following step 918.

Step 918: The CPU determines whether or not a value of the AP decrease flag is 1. When having determined that a value of the AP decrease flag is 1 (S918: Yes), the CPU executes processing of a following step 920.

Step 920: The CPU executes the braking force control in such a manner that a differential value of the controlled braking force at the current period matches with a differential value of the controlled braking force at the immediately previous period. That is, the CPU maintains the differential value of the controlled braking force at the immediately previous period. By executing the processing of the steps 912, 916, and 920, each of the differential values mB2A to mB2D (refer to the case A to the case D) of the controlled braking forces becomes, during the period P2PP4, a value more than or equal to a sum of the corresponding differential value mB1A to mB1D of the controlled braking force at the timing PP2 and the corresponding differential value of the operation driving force at the timing PP2. After the processing of the step 920, the CPU proceeds to the step 906 to tentatively terminate the present routine.

On the other hand, when having determined at the step 918 that a value of the AP decrease flag is 0 (S918: No), the CPU determines that a value of the AP zero flag is 1 and executes processing of a following step 922.

Step 922: The CPU determines whether or not a value of the AP decrease flag at the immediately previous period was 1. When having determined that a value of the AP decrease flag at the immediately previous period was 1 (S922: Yes), the CPU executes processing of a following step 924.

Step 924: The CPU determines that values of the flags have changed from the AP decrease flag=1 to the AP zero flag=1 at the current period (that is, determines that the operation of the accelerator pedal has been finished) and executes the braking force control in such a manner that the differential value mBC of the controlled braking force at the current period becomes a value less than or equal to a sum of the differential value mBp of the controlled braking force at the immediately previous period and the differential value mODp of the operation driving force at the immediately previous period (i.e., mBC mBp+mODp). The CPU thereafter proceeds to the step 906 to tentatively terminate the present routine.

On the other hand, when having determined at the step 922 that a value of the AP decrease flag at the immediately previous period was 0 (8922: No), the CPU executes processing of a following step 926.

Step 926: The CPU determines that a value of the AP zero flag at the immediately previous period was 0 (that is, the accelerator pedal operation amount have been zero over immediately previous two periods) and executes the braking force control in such a manner that a differential value of the controlled braking force at the current period matches with a differential value of the controlled braking force at the immediately previous period. That is, the CPU maintains the differential value of the controlled braking force at the immediately previous period. By executing the processing of the step 924 and the step 926, each of the differential values mB3A to mB3D (refer to the case A to the case D) of the controlled braking forces becomes, during the period P4E1, a value less than or equal to a sum of the corresponding differential value mB2A to mB2D of the controlled braking force at the timing PP4 and the corresponding differential value of the operation driving force at the timing PP4. After the processing of the step 926, the CPU proceeds to the step 906 to tentatively terminate the present routine.

In contrast, when having determined at the step 914 that a value of the AP decrease flag at the immediately previous period was 1 (S914: Yes), the CPU executes processing of a following step 928.

Step 928: The CPU determines that values of the flags have changed from the AP decrease flag=1 to the AP constant flag=1 at the current period, and executes the braking force control in such a manner that the differential value mBC of the controlled braking force at the current period becomes a value less than or equal to a sum of the differential value mBp of the controlled braking force at the immediately previous period and the differential value mODp of the operation driving force at the immediately previous period (i.e., mBC mBp+mODp). The CPU thereafter proceeds to the step 906 to tentatively terminate the present routine.

This is the description about the braking force control processing at the step 704 (refer to FIG. 7). When having finished the braking force control processing, the CPU proceeds to the step 706 in FIG. 7 via the step 906 to tentatively terminate the present routine.

Subsequently, a description about driving force control processing at the step 708 in FIG. 7 will be made. The CPU executes at the step 708 a routine shown by the flowchart in FIG. 10. That is, when the CPU proceeds to the step 708, the CPU initiates processing from a step 1000 in FIG. 10 and executes processing of a following step 1002.

Step 1002: The CPU determines whether or not the vehicle control (the AC control or the parking assist control) is being executed. When having determined that the vehicle control is not being executed (S1002: No), the CPU proceeds to a step 1008 to tentatively terminate the present routine. That is, the CPU continues the known vehicle control. On the other hand, when having determined that the vehicle control is being executed (S1002: Yes); the CPU executes processing of a following step 1004.

Step 1004: The CPU determines whether or not the accelerator pedal operation amount is positive at the current period or was positive at any period in the past. When having determined that the accelerator pedal operation amount is or was positive (S1004: Yes), the CPU determines that, during this engine on period, the accelerator pedal operation has been initiated by the driver for the first time at the current period or the accelerator pedal operation was performed by the driver in the past, and executes processing of a following step 1006.

Step 1006: The CPU executes the driving force control in such a manner that a differential value of the controlled driving force at the current period matches with a differential value of the controlled driving force at the immediately previous period. That is, the CPU maintains the differential value of the controlled driving force at the immediately previous period. This enables differential values of the controlled driving force to be maintained at a constant value during a period after a timing at which the accelerator pedal operation amount with a positive value is first detected during the execution of the vehicle control. After the processing of the step 1006, the CPU proceeds to the step 1008 to tentatively terminate the present routine.

On the other hand, when having determined at the step 1004 that the accelerator pedal operation amount is or was zero at the current period or at any period in the past (S1004: No), the CPU determines that the accelerator pedal operation has not been performed by the driver even once during this engine on period, and proceeds to the step 1008 to tentatively terminate the present routine.

This is the description about the driving force control processing at the step 708 (refer to FIG. 7). When having finished the driving force control processing, the CPU proceeds to the step 706 in FIG. 7 via the step 1008 to tentatively terminate the present routine.

Effects of the first embodiment apparatus will be described. The first embodiment apparatus executes the driving force control in such a manner that a differential value of the controlled driving force from the timing P1 to the terminal point E1 becomes constant as well as executes the braking force control in such a manner that a differential value of the controlled braking force during the period P2PP4 becomes a value more than or equal to a sum of a differential value of the controlled braking force at the timing PP2 and a differential value of the operation driving force at the timing PP2. Therefore, as shown in FIG. 3 to FIG. 6, during a period where a "period during which a differential value of the controlled braking force is maintained at a value larger than a differential value of the controlled braking force at the timing PP2 (i.e., the period P2PP4)" and a "period during which the accelerator pedal operation amount is constant (that is, a period from the timing P2 to the timing PP3 (hereinafter, also referred to as a "period P2PP3"))" overlap with each other (that is, the period P2PP3), a differential value of the first longitudinal force becomes a value more than or equal to a differential value of the first longitudinal force at the timing PP2. Therefore, a possibility that the behavior of the first longitudinal force contradicts with the accelerator pedal operation due to a decrease in a differential value of the first longitudinal force at the timing P2 can be reduced, different from the conventional configuration. It should be noted that this possibility can be rephrased as a possibility that the acceleration feeling is moderated or the deceleration feeling is increased at the timing P2 in spite of the accelerator pedal operation amount with a positive value being maintained constant at the timing P2.

In addition, the first embodiment apparatus increases a "differential value of the controlled braking force" not a "differential value of the controlled driving force" during the period P2PP4 and thereby prevents a differential value of the first longitudinal force at the timing P2 from decreasing. Since the controlled braking force is a negative value, the larger a differential value thereof becomes, the smaller a magnitude itself of the controlled braking force becomes compared to a configuration where a differential value is constant. According to this configuration, a possibility of placing a large burden on both of the throttle actuator 21 and the brake actuator 22 can be reduced compared to a configuration where a "differential value of the controlled driving force" is increased during the P2PP4.

As stated above, according to the first embodiment apparatus, a possibility of placing a burden on the actuators can be reduced as well as a possibility that the behavior of the first longitudinal force contradicts with the accelerator pedal operation can be reduced.

Further, the first embodiment apparatus executes the braking force control in such a manner that a differential value of the controlled braking force during the period P4E1 becomes a value less than or equal to a sum of a differential value of the controlled braking force at the timing PP4 and a differential value of the operation driving force at the timing PP4. Therefore, as shown in FIG. 3 to FIG. 6, during a period where a "period during which a differential value of the controlled braking force is maintained at a value smaller than a differential value of the controlled braking force at the timing PP4 (i.e., the period P4E1)" and a "period during which the accelerator pedal operation amount is zero (that is, the period P4E1)" overlap with each other (that is, the period P4E1), a differential value of the first longitudinal force becomes a value less than or equal to a differential value of the first longitudinal force at the timing PP4. Therefore, a possibility that the behavior of the first longitudinal force contradicts with the accelerator pedal operation due to an increase in a differential value of the first longitudinal force at the timing P4 can be reduced, different from the conventional configuration. It should be noted that this possibility can be rephrased as a possibility that the acceleration feeling is increased or the deceleration feeling is decreased at the timing P4 in spite of the accelerator pedal operation being terminated at the timing P4.

(Second Embodiment)

Next, a vehicle control apparatus according to a second embodiment of the present invention (hereinafter, also referred to as a "second embodiment apparatus") will be described, referring to figures. The second embodiment apparatus has two differences compared to the first embodiment apparatus. The first difference is related to a method for controlling a throttle actuator. To be more specific, in the second embodiment apparatus, the ECU 10 does not apply the operation driving force on the vehicle. That is, even when the accelerator pedal operation amount is detected by the accelerator pedal operation amount sensor 12, the ECU 10 does not execute processing to control the throttle actuator 21 based on this detected operation amount and the driving state amounts detected by other engine state amount sensors of the vehicle. Therefore, assuming that a sum of the controlled driving force and the controlled braking force is a "second longitudinal force", net force acting on the vehicle becomes a sum of the second longitudinal force and the external force.

The second difference is related to braking force control process. To be more specific, although a differential value of the controlled braking force was changed at the timing P2 and at the timing P4 in the first embodiment apparatus, a differential value of the controlled braking force is changed at the timing P1 and at the timing P3 in the second embodiment apparatus. In the following, a description will be made, taking four cases as examples, the description being about operation detail of the second embodiment apparatus in a case when an accelerator pedal operation amount with a non-zero value is detected in the midst of the controlled driving force and the controlled braking force (in more detail, the controlled braking force with a non-zero value) are simultaneously being applied on the vehicle by the vehicle control. It should be noted that in the following, the differences from the first embodiment apparatus will be mainly described, omitting a description on a similar configuration to the first embodiment apparatus.

Case E: Case where the Vehicle Starts by the AC Control

Figure 11:
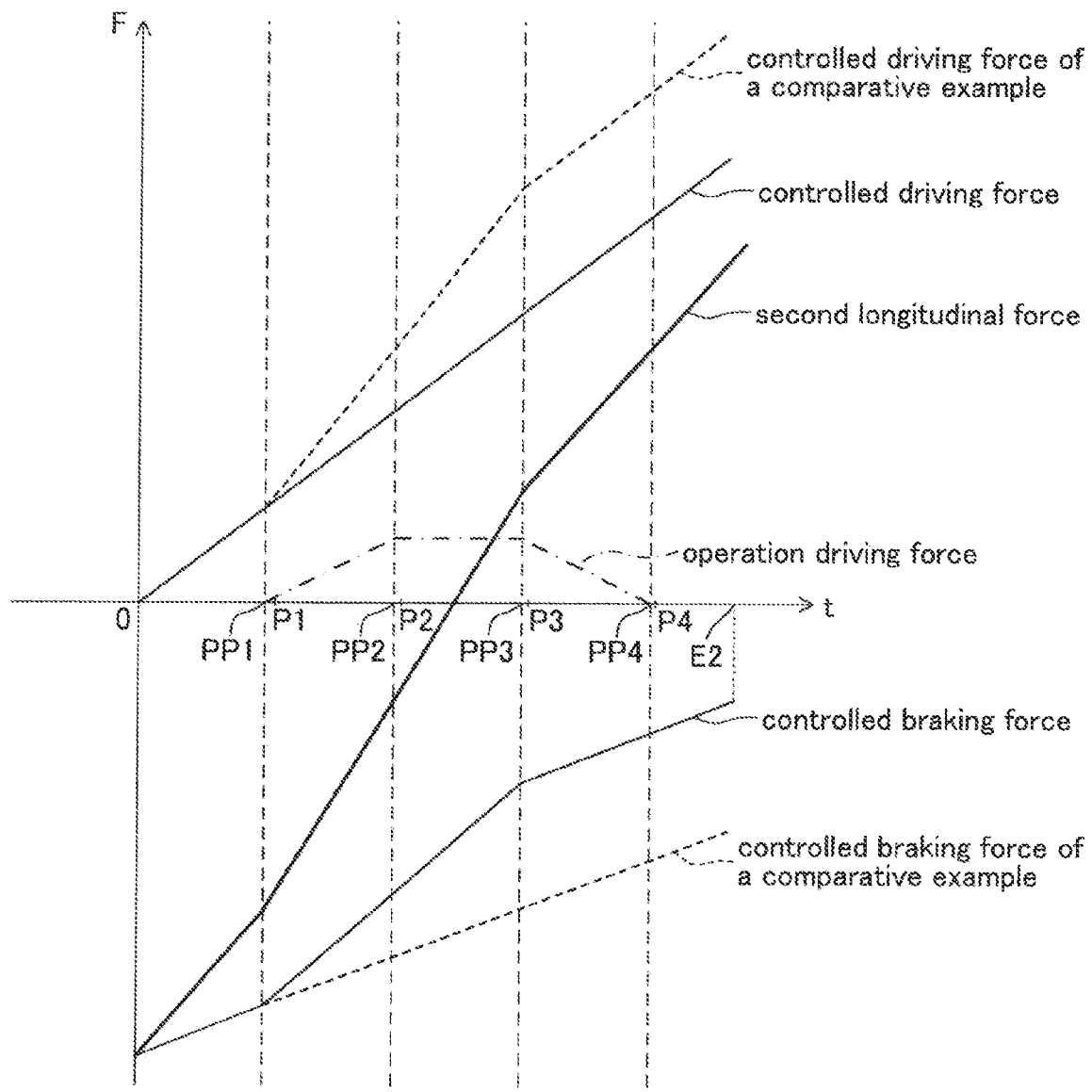
FIG. 11 is a time chart showing a time transition of each force acting on the vehicle and the operation driving force in a case when the accelerator pedal operation has been performed during the execution of the AC control (case E).

FIG. 11 is a time chart showing a time transition of each force acting on the vehicle and operation driving force (mentioned later) in a case E. The present case assumes a case where the driver operates the accelerator pedal in the midst of the shifting control for a purpose of increasing the acceleration feeling. It should be noted that as stated above, the driving force based on the accelerator pedal operation amount is not reflected on a behavior of the vehicle in the present embodiment, and therefore this driving force is shown in one dot chain line. Hereinafter, this driving force will be referred to as "operation driving force" for the sake of convenience.

(Braking Force Control)

During the execution of the AC control, the second embodiment apparatus executes the known AC control until the accelerator pedal operation amount with a positive value is first detected (that is, until the timing P1 arrives). After the timing P1, the second embodiment apparatus executes, based on the values of the flags set with a similar method to the method in the first embodiment, the braking force control every time the predetermined calculation interval elapses.

The second embodiment apparatus executes the braking force control in such a manner that a differential value of the controlled braking force at following timings, that is a "timing at which a value of the AP increase flag becomes 1 for the first time (that is, a timing at which the accelerator pedal operation is initiated by the driver for the first time)" and a "timing at which values of the flags have changed from the AP zero flag=1, the AP constant flag=1, or the AP decrease flag=1 to the AP increase flag=1" becomes a value larger than a differential value of the controlled braking force at timings (periods) immediately before the above-mentioned timings. In addition, the second embodiment apparatus executes the braking force control in such a manner that a differential value of the controlled braking force at a timing at which values of the flags have changed from the AP constant flag=1 or the AP increase flag=1 to the AP decrease flag=1 becomes a value smaller than a differential value of the controlled braking force at a timing immediately before the above-mentioned timing. Further, at any timings other than the above-mentioned timings, the second embodiment apparatus executes the braking force control in such a manner that a differential value of the controlled braking force matches with a differential value of the controlled braking force at an immediately previous timing.

In the present case, a value of the AP increase flag becomes 1 for the first time at the timing P1, and values of the flags change from the AP constant flag=1 to the AP decrease flag=1 at the timing P3. Therefore, the second embodiment apparatus executes the braking force control in such a manner that a differential value of the controlled braking force at the timing P1 becomes a value larger than a differential value of the controlled braking force at the timing PP1. In addition, the second embodiment apparatus executes the braking force control in such a manner that a differential value of the controlled braking force at the timing P3 becomes a value smaller than a differential value of the controlled braking force at the timing PP3. Further, at timings other than the timing P1 and the timing P3, the second embodiment apparatus executes the braking force control in such a manner that a differential value of the controlled braking force matches with a differential value of the controlled braking force at an immediately previous timing.

As a result, a differential value of the controlled braking force becomes a constant value mB5E during the period P1PP3. The value mB5E is larger than a differential value mB4E of the controlled braking force at the timing PP1 (mB5E>mB4E). In addition, a differential value of the controlled braking force becomes a constant value mB6E smaller than the above value mB5E (mB6E<mB5E) during a period from the timing P3 to a terminal point E2 (hereinafter, also referred to as a "period P3E2"), the terminal point E2 being a timing corresponding to a right-sided end point of the controlled braking force in the present case. It should be noted that the timing PP3 and the period P1PP3 correspond to one example of a "third terminal timing" and a "third period", respectively. In addition, the terminal point E2 and the period P3E2 correspond to one example of a "fourth terminal timing" and a "fourth period", respectively.

The execution of the braking force control and the driving force control by the second embodiment apparatus increases a differential value of the second longitudinal force (i.e., jerk of the vehicle) at the timing P1 and decreases a differential value of the second longitudinal force at the timing P3. That is, the increase in the acceleration feeling or the moderation in the deceleration feeling is realized at the timing P1, and the moderation in the acceleration feeling or the increase in the deceleration feeling is realized at the timing P3.

It should be noted that a following configuration may be adopted in the second embodiment apparatus, the configuration being a configuration where a differential value of the controlled braking force at the timing P2 is increased by a larger amount compared to a differential value of the controlled braking force at the timing PP1 as an average rate of change of the accelerator pedal operation amount during the period P1PP2 increases. However, when a value increased by this configuration is smaller than a differential value of the controlled braking force at the timing PP2, the differential value of the controlled braking force at the timing PP2 is used on a priority basis (preferentially) as a differential value of the controlled braking force at the timing P2. This is because the second embodiment apparatus is configured in such a manner that the differential value of the controlled braking force at the timing P2 never becomes smaller than the differential value of the controlled braking force at the timing PP2.

Figure 12:
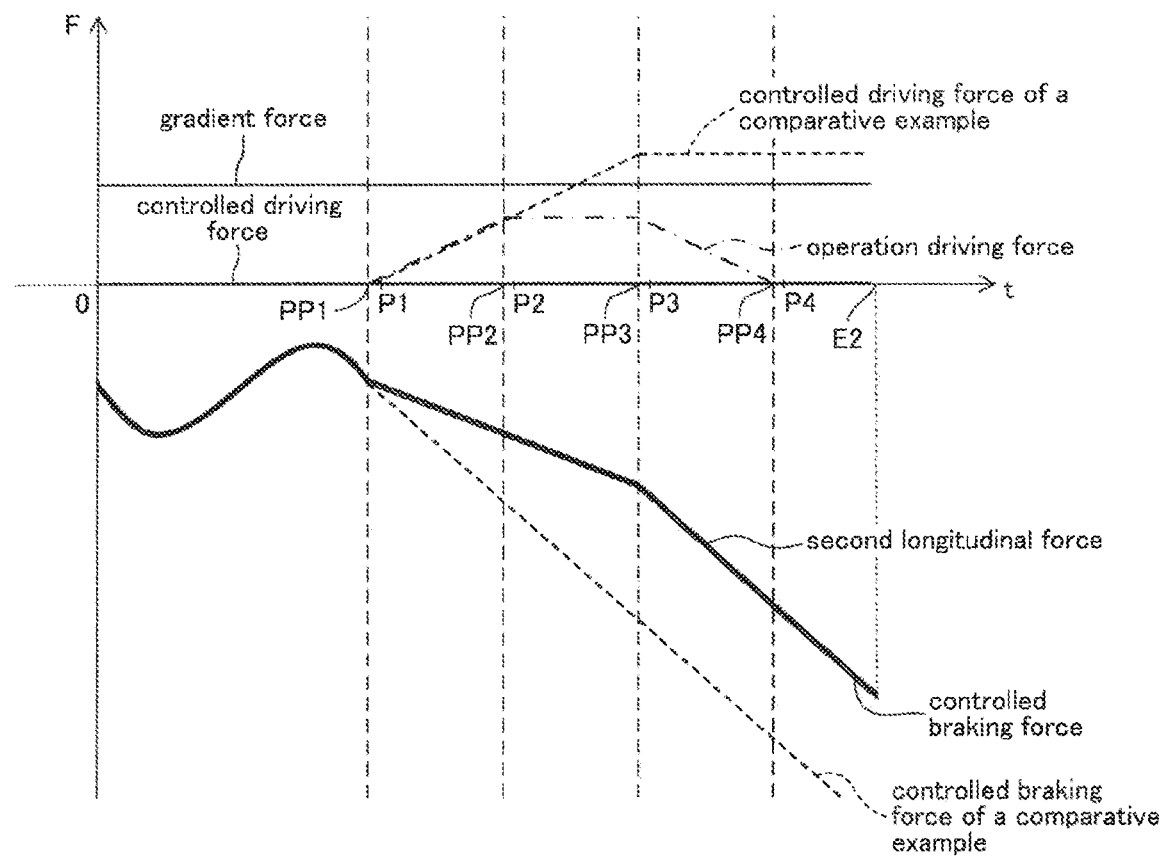
FIG. 12 is a time chart showing a time transition of each force acting on the vehicle and the operation driving force in a case when the accelerator pedal operation has been performed during the execution of the AC control (case F).

Case F: Case where the Vehicle is Traveling on a Descending Road by the AC Control FIG. 12 is a time chart showing a time transition of each force acting on the vehicle and the operation driving force in a case F. The present case assumes a case where the driver operates the accelerator pedal for a purpose of moderating the deceleration feeling under a situation where the vehicle is traveling on a descending road during the execution of the AC control.

(Braking Force Control)

During the execution of the AC control, the second embodiment apparatus executes the known AC control until the accelerator pedal operation amount with a positive value is first detected (that is, until the timing P1 arrives). After the timing P1, the second embodiment apparatus executes, based on the values of the flags set as described above, the braking force control every time the predetermined calculation interval elapses.

In the present case, the second embodiment apparatus executes the braking force control similar to the control in the case E. As a result, a differential value of the controlled braking force becomes a constant value mB5F during the period P1PP3, This value mB5F is larger than a differential value mB4F of the controlled braking force at the timing PP1 (mB5F>mB4F). In addition, a differential value of the controlled braking force becomes, during the period P3E2, a constant value mB6F smaller than the above value mB5F (mB6F<mB5F).

Figure 13:
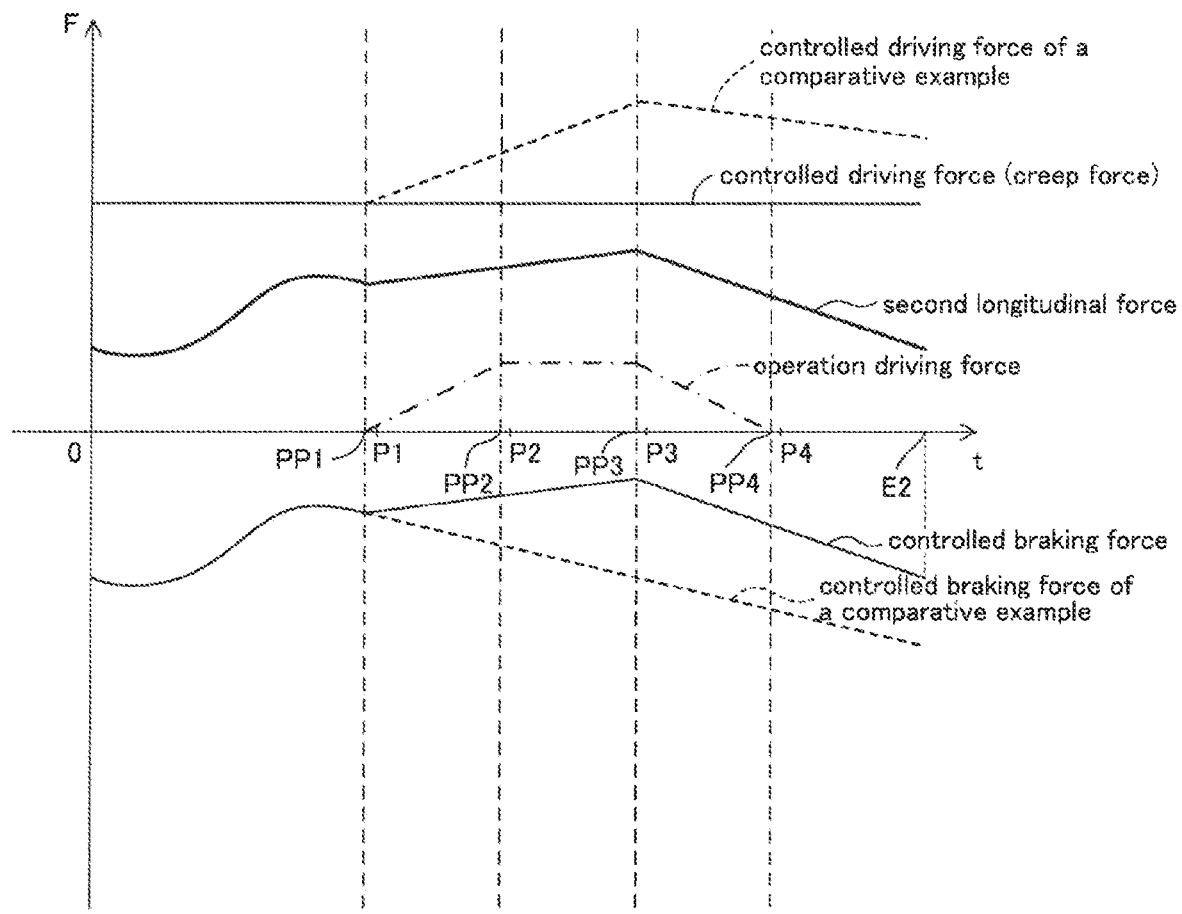
FIG. 13 is a time chart showing a time transition of each force acting on the vehicle and the operation driving force in a case when the accelerator pedal operation has been performed during the execution of the parking assist control (case G).

Case G: Case where the Vehicle is Traveling at a Slow Speed by the Parking Assist Control FIG. 13 is a time chart showing a time transition of each force acting on the vehicle and the operation driving force in a case G. The present case assumes a case where the driver operates the accelerator pedal for a purpose of increasing the acceleration feeling under a situation where the vehicle is traveling on a horizontal road at a slow speed by the parking assist control. In the present case, the controlled driving force is maintained at a value of creep force, and the acceleration control and the deceleration control of the vehicle are executed only by the controlled braking force.

(Braking Force Control)

During the execution of the parking assist control, the second embodiment apparatus executes the known parking assist control until the accelerator pedal operation amount with a positive value is first detected (that is, until the timing P1 arrives). After the timing P1, the second embodiment apparatus executes, based on the values of the flags set as described above, the braking force control every time the predetermined calculation interval elapses.

In the present case, the second embodiment apparatus executes the braking force control similar to the control in the case E, As a result, a differential value of the controlled braking force becomes a constant value mB5G during the period P1PP3. This value mB5G is larger than a differential value mB4G of the controlled braking force at the timing PP1 (mB5G>mB4G). In addition, a differential value of the controlled braking force becomes, during the period P3E2, a constant value mB6G smaller than the above value mB5G (mB6G<mB5G).

Figure 14:
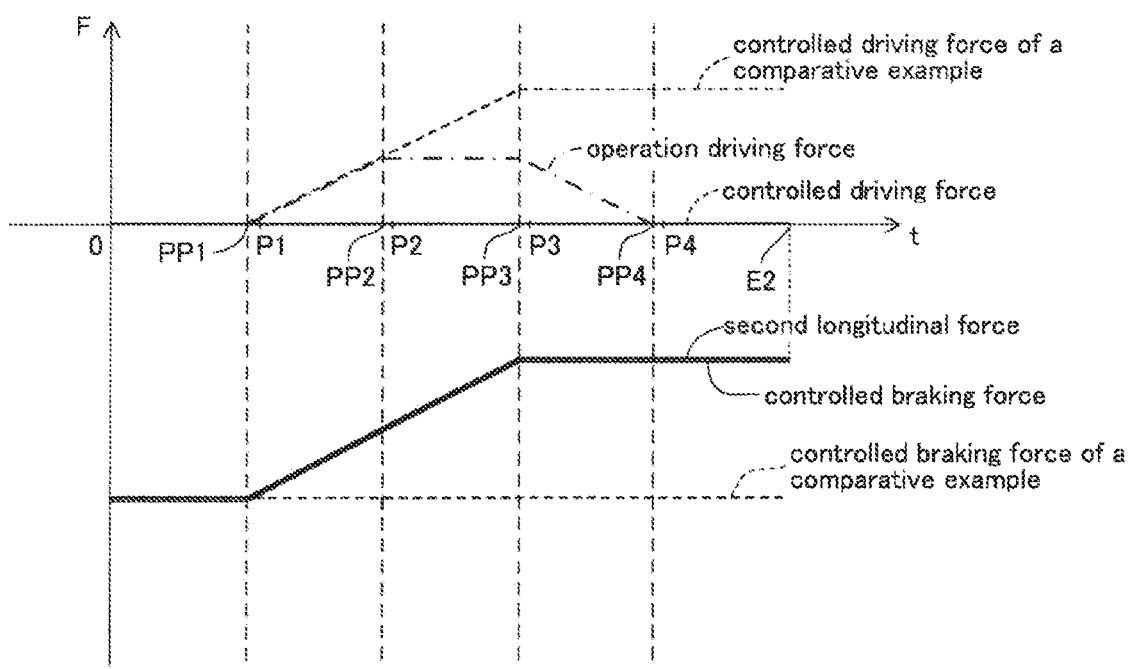
FIG. 14 is a time chart showing a time transition of each force acting on the vehicle and the operation driving force in a case when the accelerator pedal operation has been performed during the execution of the AC control (case H).

Case H: Case where the Vehicle is Decelerating at a Constant Acceleration by the AC Control FIG. 14 is a time chart showing a time transition of each force acting on the vehicle and the operation driving force in a case H. The present case assumes a case where the driver operates the accelerator pedal for a purpose of moderating the deceleration feeling under a situation where the vehicle is decelerating at a constant acceleration by the AC control. Therefore, the controlled driving force is maintained at a zero value in the present case, (Braking Force Control)

During the execution of the AC control, the second embodiment apparatus executes the known AC control (that is, a control to maintain the controlled braking force at a negative constant value) until the accelerator pedal operation amount with a positive value is first detected (that is, until the timing P1 arrives). After the timing P1, the second embodiment apparatus executes, based on the values of the flags set as described above, the braking force control every time the predetermined calculation interval elapses.

In the present case, the second embodiment apparatus executes the braking force control similar to the control in the case E. As a result, a differential value of the controlled braking force becomes a constant value mB5H during the period P1PP3. This value mB5H is larger than a differential value mB4H (a zero value in the present case) of the controlled braking force at the timing PP1 (mB5H>mB4H). In addition, a differential value of the controlled braking force becomes, during the period P3E2, a constant value mB6H (a zero value in the present case) smaller than the above value mB5H (mB6H<mB5H).

<Specific Operation of the Second Embodiment Apparatus>

Next, specific operation of the second embodiment apparatus will be described. Flag setting process and driving force control process executed by the second embodiment apparatus are similar to the processes executed by the first embodiment apparatus, and therefore in the following, braking force control process will be only described. The CPU of the ECU 10 is configured to execute a routine shown by a flowchart in FIG. 15 every time the predetermined calculation interval elapses during the engine on period.

Figure 15:
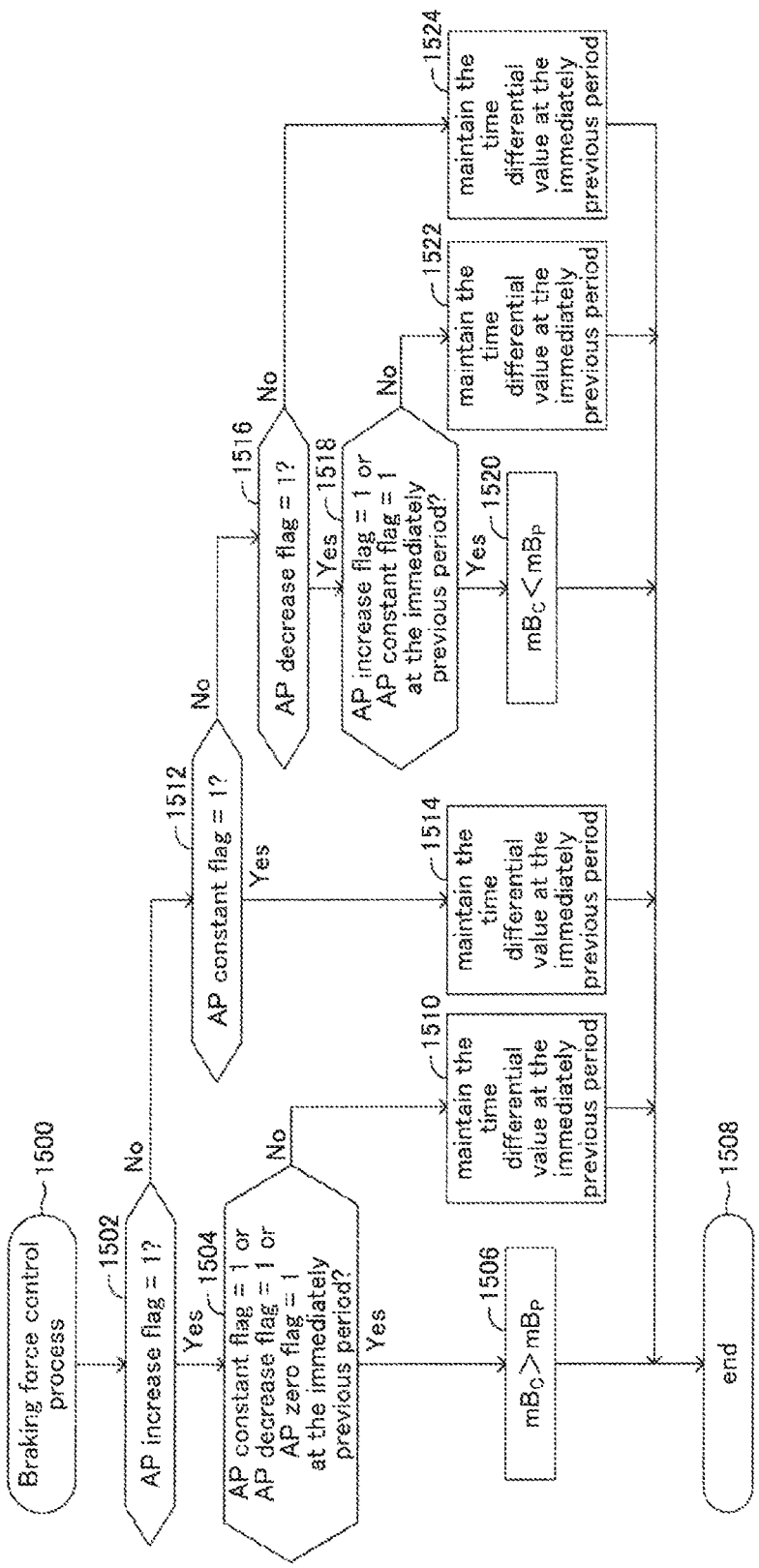
FIG. 15 is a flowchart showing braking force control process among routines executed by CPU of vehicle control ECU of a second embodiment apparatus.

When a predetermined timing arrives, the CPU initiates processing from a step 1500 in FIG. 15 and executes processing of a following step 1502.

Step 1502: The CPU determines whether or not a value of the AP increase flag is 1. When having determined that a value of the AP increase flag is 1 (S1502: Yes), the CPU executes processing of a following step 1504.

Step 1504: The CPU determines whether or not any value of the following flags at the immediately previous period, that is, the AP constant flag, the AP decrease flag, or the AP zero flag was 1. When having determined that a value of any one of these flags at the immediately previous period was 1 (S1504: Yes), the CPU executes processing of a following step 1506.

Step 1506: The CPU determines that values of the flags have changed from the AP constant flag=1, the AP decrease flag=1 or the AP zero flag=1 to the AP increase flag=1 at the current period, and executes the braking force control in such a manner that the differential value mBC of the controlled braking force at the current period becomes a value larger than the differential value mBp of the controlled braking force at the immediately previous period (i.e., mBC>mBp). The CPU thereafter proceeds to a step 1508 to tentatively terminate the present routine.

On the other hand, when having determined at the step 1504 that a value of the AP increase flag at the immediately previous period was 1 (S1504: No), the CPU executes processing of a following step 1510.

Step 1510: The CPU determines that the accelerator pedal operation amount have been increasing over immediately previous two periods, and executes the braking force control in such a manner that a differential value of the controlled braking force at the current period matches with a differential value of the controlled braking force at the immediately previous period. That is, the CPU maintains the differential value of the controlled braking force at the immediately previous period. The CPU thereafter proceeds to the step 1508 to tentatively terminate the present routine.

On the other hand, when having determined at the step 1502 that a value of the AP increase flag is 0 (S1502: No), the CPU determines that the change amount of the accelerator pedal operation amount at the current period is zero or negative to execute processing of a following step 1512.

Step 1512: The CPU determines whether or not a value of the AP constant flag is 1. When having determined that a value of the AP constant flag is 1 (S1512: Yes), the CPU executes processing of a following step 1514.

Step 1514: The CPU executes the braking force control in such a manner that a differential value of the controlled braking force at the current period matches with a differential value of the controlled braking force at the immediately previous period. That is, the CPU maintains the differential value of the controlled braking force at the immediately previous period. By executing the processing of the steps 1506, 1510, and 1514, each of the differential values mB5E to mB5H of the controlled braking forces is maintained, during the period P1PP3, at a value larger than the corresponding differential value mB4E to mB4H (refer to the case E to the case H) of the controlled braking force at the timing PP1. After the processing of the step 1514, the CPU proceeds to the step 1508 to tentatively terminate the present routine.

In contrast, when having determined at the step 1512 that a value of the AP constant flag is 0 (S1512: No), the CPU executes processing of a following step 1516.

Step 1516: The CPU determines whether or not a value of the AP decrease flag is 1. When having determined that a value of the AP decrease flag is 1 (S1516: Yes), the CPU executes processing of a following step 1518.

Step 1518: The CPU determines whether or not a value of either the AP increase flag or the AP constant flag at the immediately previous period was 1. When having determined that either value of these flags at the immediately previous period was 1 (S1518: Yes), the CPU executes processing of a following step 1520.

Step 1520: The CPU determines that values of the flags have changed from the AP increase flag=1 or the AP constant flag=1 to the AP decrease flag=1 at the current period, and executes the braking force control in such a manner that the differential value mBC of the controlled braking force at the current period becomes a value smaller than the differential value mBp of the controlled braking force at the immediately previous period (i.e., mBC<mBp). The CPU thereafter proceeds to the step 1508 to tentatively terminate the present routine.

On the other hand, when having determined at the step 1518 that a value of the AP decrease flag at the immediately previous period was 1 (S1518: No), the CPU executes processing of a following step 1522.

Step 1522: The CPU determines that the accelerator pedal operation amount have been decreasing over immediately previous two periods, and executes the braking force control in such a manner that a differential value of the controlled braking force at the current period matches with a differential value of the controlled braking force at the immediately previous period. That is, the CPU maintains the differential value of the controlled braking force at the immediately previous period. The CPU thereafter proceeds to the step 1508 to tentatively terminate the present routine.

On the other hand, when having determined at the step 1516 that a value of the AP decrease flag is 0 (S1516: No), the CPU executes processing of a following step 1524.

Step 1524: The CPU determines that a value of the AP zero flag is 1 at the current period (that is, the accelerator pedal operation amount and the change amount thereof are both zero), and executes the braking force control in such a manner that a differential value of the controlled braking force at the current period matches with a differential value of the controlled braking force at the immediately previous period. That is, the CPU maintains the differential value of the controlled braking force at the immediately previous period. By executing the processing of the steps 1520, 1522, and 1524, each of the differential values mB6E to mB6H of the controlled braking forces is maintained, during the period P3E2, at a value smaller than the corresponding differential value mB5E to mB5H of the controlled braking force at the timing PP3. After the processing of the step 1524, the CPU proceeds to the step 1508 to tentatively terminate the present routine. It should be noted that the above routine shows a routine in a case where the accelerator pedal operation had been already finished and thereafter has been initiated again in some engine on period.

Effects of the second embodiment apparatus will be described. The second embodiment apparatus executes the driving force control in such a manner that a differential value of the controlled driving force from the timing P1 to the terminal point E2 becomes constant as well as executes the braking force control in such a manner that a differential value of the controlled braking force during the period P1PP3 becomes a value larger than a differential value of the controlled braking force at the timing PP1. In the second embodiment apparatus, a behavior of the second longitudinal force does not depend on the operation driving force. Therefore, according to the above configuration, a timing at which a differential value of the second longitudinal force increases or decreases coincides with a timing at which a differential value of the controlled braking force increases or decreases. That is, as shown in FIG. 11 to FIG. 14, a differential value of the second longitudinal force during the period P1PP3 becomes a value larger than a differential value of the second longitudinal force at the timing PP1 (the acceleration feeling of the vehicle is increased or the deceleration feeling of the vehicle is moderated at the timing P1). The driver initiates the operation of the accelerator pedal, expecting the acceleration feeling to be increased or the deceleration feeling to be moderated at the timing P1. Thus, according to a configuration of the second invention apparatus, a possibility that the behavior of the second longitudinal force contradicts with the accelerator pedal operation can be reduced.

Now, the behavior of the second longitudinal force stated above can be realized by a following configuration as well. That is, this behavior can be realized by a "configuration (hereinafter, also referred to as a "first configuration") where the braking force control is executed in such a manner that a differential value of the controlled braking force during the period P1PP3 matches with a differential value of the controlled braking force at the timing PP1, and instead, the driving force control is executed in such a manner that a differential value of the controlled driving force during the period P1PP3 becomes a value larger than a differential value of the controlled driving force at the timing PP1". "Controlled braking force of a comparative example" during the period P1PP3 in FIG. 11 to FIG. 14 indicates controlled braking force applied on the vehicle by the braking force control in this first configuration. "Controlled driving force of a comparative example" during the period P1PP3 in FIG. 11 to FIG. 14 indicates controlled driving force applied on the vehicle by the driving force control in this first configuration. As is obvious from FIG. 11 to FIG. 14, in the first configuration, both magnitudes of the controlled braking force and the controlled driving force are larger during the period P1PP3 than those in the configuration of the second embodiment apparatus. Therefore, it is true that according to the first configuration, the behavior of the second longitudinal force comes to hardly contradict with the accelerator pedal operation, but there is a possibility of placing a large burden both on the throttle actuator 21 and the brake actuator 22.

In contrast, the second embodiment apparatus increases a "differential value of the controlled braking force" not a "differential value of the controlled driving force" during the period P1PP3. Since the controlled braking force is a negative value, the larger a differential value thereof becomes, the smaller a magnitude itself of the controlled braking force becomes compared to a configuration where a differential value is constant. Therefore, according to the second embodiment apparatus, a burden on the actuators can be reduced compared to the first configuration. As a result, a possibility of placing a burden on the actuators can be reduced as well as a possibility that the behavior of the second longitudinal force contradicts with the accelerator pedal operation can be reduced.

In addition, the second embodiment apparatus executes the braking force control in such a manner that a differential value of the controlled braking force during the period P3E2 becomes a value smaller than a differential value of the controlled braking force at the timing PP3. Therefore, as shown in FIG. 11 to FIG. 14, a differential value of the second longitudinal force during the period P3E2 becomes a value smaller than a differential value of the second longitudinal force at the timing PP3 (the acceleration feeling of the vehicle is moderated or the deceleration feeling of the vehicle is increased at the timing P3). The driver initiates releasing the accelerator pedal at the timing P3, expecting the acceleration feeling to be moderated or the deceleration feeling to be increased. Therefore, according to the configuration of the second embodiment apparatus, a possibility that the behavior of the second longitudinal force contradicts with the accelerator pedal operation can be further reduced.

Now, the behavior of the second longitudinal force stated above can be realized by a following configuration as well. That is, this behavior can be realized by a "configuration (hereinafter, also referred to as a "second configuration") where the braking force control is executed in such a manner that a differential value of the controlled braking force during the period P3E2 matches with a differential value of the controlled braking force at the timing PP3, and instead, the driving force control is executed in such a manner that a differential value of the controlled driving force during the period P3E2 becomes a value smaller than a differential value of the controlled driving force at the timing PP3". "Controlled braking force of a comparative example" during the period P3E2 in FIG. 11 to FIG. 14 indicates controlled braking force applied on the vehicle by the braking force control in this second configuration. "Controlled driving force of a comparative example" during the period P3E2 in FIG. 11 to FIG. 14 indicates controlled driving force applied on the vehicle by the driving force control in this second configuration. The second configuration is adopted along with the first configuration. Therefore, as shown in FIG. 11 to FIG. 14, in the second configuration, both magnitudes of the controlled braking force and the controlled driving force are significantly larger during the period P3E2 than those in the configuration of the second embodiment apparatus. Therefore, it is true that according to the second configuration, the behavior of the second longitudinal force comes to hardly contradict with the accelerator pedal operation, but there is a possibility of placing a large burden both on the throttle actuator 21 and the brake actuator 22.

In contrast, in the second embodiment apparatus, as shown in FIG. 11 to FIG. 14, by executing the braking force control and the driving force control during the period P1PP3, a magnitude of the controlled braking force is significantly decreased compared to that of the controlled braking force of the comparative example and a magnitude of the controlled driving force is significantly decreased compared to that of the controlled driving force of the comparative example. Therefore, even though the braking force control is executed so as to decrease a differential value of the controlled braking force at the timing P3, a possibility that a magnitude of the "controlled braking force based on the configuration of the second embodiment apparatus" becomes larger than a magnitude of the "controlled braking force of the comparative example" is extremely low. Therefore, according to the configuration of the second embodiment apparatus, a possibility of placing a burden on the actuators can be reduced as well as a possibility that the behavior of the second longitudinal force contradicts with the accelerator pedal operation can be reduced.

The vehicle control apparatuses according to the embodiments of the present invention have been described. However, the present invention is not limited to the aforementioned embodiments and may adopt various modifications within a scope of the present invention.

For example, the above embodiments illustrated cases where the AC control and the parking assist control are executed as the vehicle control. However, types of the vehicle control are not limited thereto. For instance, automatic driving control and/or automatic parking control may be adopted as the vehicle control.

In addition, in the first embodiment, although the timing PP4 is selected as the first terminal timing, any timing may be selected as the first terminal timing as long as the selected timing is positioned within the period P2PP4. However, the accelerator pedal operation amount is constant during the period P2PP3, and therefore it is preferable that a differential value of the controlled braking force is constant during this period. Because of this, it is preferable that the first terminal timing is selected from among timings within the period P3PP4. Similarly, in the second embodiment, although the timing PP3 is selected as the third terminal timing, any timing may be selected as the third terminal timing as long as the selected timing is positioned within the period P1PP3. In addition, in the second embodiment, although the timing E2 which is a timing after the timing P4 is selected as the fourth terminal timing, a timing within the period P3PP4 may be selected.

Further, in the above embodiments, the driving force control is executed in such a manner that a differential value of the controlled driving force becomes a constant value during a period from a timing of t=0 to the terminal point E1 (E2). However, a configuration is not limited thereto. Assuming that a differential value of the controlled braking force is changed at a predetermined timing A and that this changed differential value is maintained constant during a period AB from the timing A to a predetermined timing B, a following configuration may be adopted, the configuration being a configuration where the driving force control is executed in such a manner that a differential value of the controlled driving force during the period AB matches with a differential value of the controlled driving force at a timing PA which is a timing immediately before the timing A. In other words, a configuration where the driving force control is executed based on values of the flags may be adopted.

Further, in the first embodiment, although a differential value of the controlled braking force during the period AB is set based on a sum of a differential value of the controlled braking force at the timing PA immediately before the timing A and a differential value of the operation driving force at the timing PA, a configuration is not limited thereto. For example, a differential value of the controlled braking force during the period AB may be set based on a sum of an average rate of change of the controlled braking force during a period C which is a period including immediate plural timings including the timing PA and an average rate of change of the operation driving force during the period C. Similarly, in the second embodiment, although a differential value of the controlled braking force during the period AB is set based on a differential value of the controlled braking force at the timing PA, a configuration is not limited thereto. For example, a differential value of the controlled braking force during the period AB may be set based on the average rate of change of the controlled braking force during the period C.

Further, in the first embodiment, although differential values of the controlled braking force are changed at both timings of the timing P2 and the timing P4, a configuration where a differential value of the controlled braking force is changed only at either one timing may be adopted. Similarly, in the second embodiment, although differential values of the controlled braking force are changed at both timings of the timing P1 and the timing P3, a configuration where a differential value of the controlled braking force is changed only at either one timing may be adopted.

The invention claimed is:

1. A vehicle control apparatus comprising vehicle control means for executing driving force control to change controlled driving force which is driving force automatically applied on a vehicle and braking force control to change controlled braking force which is braking force automatically applied on said vehicle so as to control an acceleration state and a deceleration state of said vehicle comprising;
   detecting means for detecting an operation amount of an accelerator operator operated by a driver; and
   operation driving force control means for adding operation driving force to said controlled driving force, said operation driving force becoming larger as said detected operation amount increases, and applying on said vehicle said controlled driving force, said operation driving force has been applied thereto,
   wherein,
   in a case where said vehicle control means determines, when braking force with a non-zero value is being applied by said braking force control, based on said operation amount, that an operation of said accelerator operator is initiated at a first timing and thereafter said operation amount continues to increase until a second specific timing immediately before a second timing arrives to become constant at said second timing, said vehicle control means is configured to;
   execute said driving force control in such a manner that a time differential value of said controlled driving force during a first period from said second timing to a first terminal timing which is a timing after said second timing matches with a time differential value of said controlled driving force at said second specific timing; and
   execute said braking force control in such a manner that a time differential value of said controlled braking force during said first period becomes a value more than or equal to a sum of a time differential value of said controlled braking force at said second specific timing and a time differential value of said operation driving force at said second specific timing.

2. The vehicle control apparatus according to claim 1, wherein,
   in a case where said vehicle control means determines, when braking force with a non-zero value is being applied by said braking force control, that said operation amount starts to decrease from a third timing which is a timing after said second timing and thereafter continues to decrease until a fourth specific timing immediately before a fourth timing arrives to become constant at said fourth timing, said vehicle control means is configured to;
   execute said driving force control in such a manner that a time differential value of said controlled driving force during a second period from said fourth timing to a second terminal timing which is a timing after said fourth timing matches with a time differential value of said controlled driving force at said fourth specific timing; and execute said braking force control in such a manner that a time differential value of said controlled braking force during said second period becomes a value less than or equal to a sum of a time differential value of said controlled braking force at said fourth specific timing and a time differential value of said operation driving force at said fourth specific timing.

3. A vehicle control apparatus comprising vehicle control means for executing driving force control to change controlled driving force which is driving force automatically applied on a vehicle and braking force control to change controlled braking force which is braking force automatically applied on said vehicle so as to control an acceleration state and a deceleration state of said vehicle comprising;

detecting means for detecting an operation amount of an accelerator operator operated by a driver, wherein, in a case where said vehicle control means determines, when braking force with a non-zero value is being applied by said braking force control, based on said operation amount, that an operation of said accelerator operator is initiated at a first timing and thereafter said operation amount continues to increase until a second specific timing immediately before a second timing arrives to become constant at said second timing, said vehicle control means is configured to;

execute said driving force control in such a manner that a time differential value of said controlled driving force during a third period from said first tinning to a third terminal timing which is a timing after said first timing matches with a time differential value of said controlled driving force at a first specific timing immediately before said first timing; and execute said braking force control in such a manner that a time differential value of said controlled braking force during said third period becomes a value larger than a time differential value of said controlled braking force at said first specific timing.

4. The vehicle control apparatus according to claim 3, wherein, in a case where said vehicle control means determines, when braking force with a non-zero value is being applied by said braking force control, that said operation amount starts to decrease from a third timing which is a timing after said second timing, said vehicle control means is configured to;

execute said driving force control in such a manner that a time differential value of said controlled driving force during a fourth period from said third timing to a fourth terminal timing which is a timing after said third timing matches with a time differential value of said controlled driving force at a third specific timing immediately before said third timing; and execute said braking force control in such a manner that a time differential value of said controlled braking force during said fourth period becomes a value less than a time differential value of said controlled braking force at said third specific timing.

* * * * *